(12) United States Patent
Kobayashi et al.

(10) Patent No.: US 7,278,326 B2
(45) Date of Patent: Oct. 9, 2007

(54) PRESSURE SENSOR AND METHOD FOR FABRICATING THE SAME

(75) Inventors: Chiaki Kobayashi, Tottori (JP); Daisuke Sumi, Tottori (JP); Hiroshi Inamura, Tottori (JP); Togo Morifuji, Tottori (JP); Koji Yoshida, Tottori (JP); Masaki Endo, Tottori (JP); Sayaka Hiura, Tottori (JP); Takao Yamauchi, Tottori (JP); Syunsuke Yamaura, Tottori (JP); Kaoru Taketa, Tottori (JP); Kimihiko Nagami, Tottori (JP)

(73) Assignees: Sanyo Electric Co., Ltd., Osaka (JP); Tottori Sanyo Electric Co., Ltd, Tottori (JP)

( * ) Notice: Subject to any disclaimer, the term of this patent is extended or adjusted under 35 U.S.C. 154(b) by 139 days.

(21) Appl. No.: 10/507,367

(22) PCT Filed: Mar. 27, 2003

(86) PCT No.: PCT/JP03/03898

§ 371 (c)(1),
(2), (4) Date: Apr. 27, 2005

(87) PCT Pub. No.: WO03/083424

PCT Pub. Date: Oct. 9, 2003

(65) Prior Publication Data

US 2005/0172722 A1  Aug. 11, 2005

(30) Foreign Application Priority Data

Mar. 29, 2002  (JP)  .............................. 2002-094964
Mar. 29, 2002  (JP)  .............................. 2002-094967
Mar. 29, 2002  (JP)  .............................. 2002-094968
Aug. 29, 2002  (JP)  .............................. 2002-251324
Sep. 12, 2002  (JP)  .............................. 2002-266334
Oct. 17, 2002  (JP)  .............................. 2002-303244
Nov. 7, 2002  (JP)  .............................. 2002-323943

(51) Int. Cl.
*G01L 9/00* (2006.01)
(52) U.S. Cl. .............. 73/862.041; 73/754; 73/862.042; 73/862.046
(58) Field of Classification Search .................. 73/754, 73/862.041, 862.042, 862.046
See application file for complete search history.

(56) References Cited

U.S. PATENT DOCUMENTS 6,109,113 A  8/2000  Chavan et al.

(Continued)

FOREIGN PATENT DOCUMENTS

JP  7-83776  3/1995

(Continued)

*Primary Examiner*—Edward Lefkowitz
*Assistant Examiner*—Freddie Kirkland, III
(74) *Attorney, Agent, or Firm*—Arent Fox, LLP

(57) ABSTRACT

A pressure sensor comprising a plurality of sensor parts arranged in matrix. A first electrode being connected with first wiring and a second electrode being connected with second wiring are disposed oppositely through a cavity part in the sensor part. The second electrode bends to the first electrode side in response to a pressure from a specimen and touches the first electrode upon application of a pressure of a specified level or above. When the specimen is pressed against a pressure detecting region, both electrodes touch each other at a sensor part corresponding to a protrusions of the specimen and are separated at a sensor part corresponding to a recess. When a scanning signal is fed from a scanning circuit to one wiring and presence of a signal flowing through the second wiring is detected by a sensing circuit, a pressure being applied to each sensor part can be detected. Furthermore, the shape is detected by feeding the scanning signal from the scanning circuit to each first wiring sequentially and scanning the pressure detecting region generally.

13 Claims, 18 Drawing Sheets

U.S. PATENT DOCUMENTS 6,631,645 B1 * 10/2003 Satou et al. ............... 73/718
6,640,643 B2 * 11/2003 Ishio et al. ............... 73/718
6,889,565 B2 * 5/2005 DeConde et al. ...... 73/862.042

FOREIGN PATENT DOCUMENTS

| JP | 2000-311563 | 11/2000 |
| JP | 2000-311563 A1 | 11/2000 |
| JP | 2002-5504 A1 | 2/2002 |
| JP | 2002-55004 | 2/2002 |

* cited by examiner

PRESSURE SENSOR AND METHOD FOR FABRICATING THE SAME

CROSS-REFERENCE TO RELATED APPLICATION

This application is a National Stage entry of International Application No. PCT/JP03/03898, filed Mar. 27, 2003, the entire specification claims and drawings of which are incorporated herewith by reference.

TECHNICAL FIELD

The present invention relates to a pressure sensor and, more particularly, to a sensor for detecting a fine pattern.

BACKGROUND ART

A finger print sensor has been conventionally employed as an individual identification device, and a requirement for the finger print sensor is detection of a finger print with simplicity and good precision. Various types of finger print sensors of this kind have been studied and developed, which include a type to detect a finger print optically, a type to detect a finger print electrically, and the like. JP-A 09-126918 (1997) and JP-A 10-300610 (1998) describe, for example, that microsensor sections having electrodes are arranged in a matrix, wherein a pressure from a finger is converted into an electric signal to thereby detect a finger print. The microsensor sections each are constructed such that two electrodes are disposed opposite each other with a cavity present therebetween.

FIG. 16 is a sectional view of a microsensor section in fabrication process. An etching barrier layer 102 is stacked on a silicon substrate 101 and a first metal layer 103 made of Au or Ti is formed thereon in a predetermined pattern. The first metal layer 103 is used as a first electrode of a variable capacitor or a first terminal of a microcontactor. A separation film 104 made of polycrystalline silicon or Al is formed on and covers the first metal layer 103, and a second metal layer 105 made of Au or Ti is formed on the separation film 104. An insulating film 106 made of silicon nitride covers all over the surface of the substrate 101. An opening 107 reaching as far as the separation film 104 is formed on the surface of the microsensor section through the second metal layer 105 and the insulating film 106 to expose the separation film 104 to the outside in the opening 107. Note that this state is shown in FIG. 16. Thereafter, wet etching is applied to the substrate 101, in which a solution etches the separation film 104 made of polycrystalline silicon or Al to remove the separation film 104 and to form a cavity. After the etching, the opening 107 is closed with silicon nitride or the like to hermetically seal the cavity. When a pressure from a finger is imposed on the microsensor, the insulating film 106 and the second metal layer 105 is curved to the first metal layer 103 side depending on the pressure, to which situation an electric signal is outputted in response to thereby detect a pattern of a finger print.

The second metal layer 105 serving as the upper electrode of a microsensor requires a flexibility to curve itself to the first metal layer 103 side depending on a pressure of a finger and a restoring force to restore its deformed state to the original one when the pressure does not act any longer. Despite such a requirement, in a case where the insulating film 106 covers the second metal layer 105, which has been conventionally adopted, differences in flexibility and elasticity between the second metal layer 105 and the insulating film 106 are large since the insulating film 106 is harder as compared with a metal, resulting in a high possibility that the second metal layer 105 or the like is broken during usage. Since, especially, an insulating film which has a large thickness and plural insulating films are formed on the second metal layer 105 in order to ensure an insulating property, a large difference in flexibility occurs between the insulating film 106 and the second metal layer 105.

With increase in the number of usage times of a microsensor, the second metal layer 105 is easy to be broken to thereby reduce a precision and durability since the second metal layer 105 having a flexibility is low in strength. Because the conventional second metal layer 105 is formed flat on the whole, a flexibility and a restoring force are set by selecting a material or a thickness thereof. If a film thickness is reduced in order to obtain a flexibility, however, a restoring force is weakened, while if a film thickness is increased in order to enhance a restoring force, a flexibility is lost; therefore, it has been difficult to achieve the second meal layer 105 having sufficient flexibility and sufficient restoring force in a conventional technology.

DISCLOSURE OF THE INVENTION

The present invention has been made in light of the above problems, and it is an object of the present invention to provide a pressure sensor having a sensor section with fewer failures and proper sensitivity.

In order to achieve the above object, the present invention is directed to a pressure sensor including plural sensor sections arranged in a matrix, wherein each of the sensor section includes: a first electrode disposed in a sensor section; a first insulating film covering the first electrode; a sensor hole formed in the first insulating film and, also, exposing part of the first electrode; a cavity located at least above the sensor hole and a portion surrounding it; and a second electrode disposed opposite to the first electrode with the cavity interposed therebetween and, also, capable of being curved to the first electrode side.

The present invention is also directed to the pressure sensor with the above construction, wherein the first electrode includes: a central electrode portion located at almost the center of the sensor section; and an annular portion located in the sensor section and, also, formed so as to enclose the central electrode portion.

The present invention is also directed to the pressure sensor with the above construction, wherein the first insulating film has at least one recess on the first electrode in addition to a sensor hole thereon.

The present invention is also directed to the pressure sensor with the above construction, wherein an end edge of the first insulating film is located at the periphery of the first electrode.

The present invention is also directed to the pressure sensor with the above construction, wherein a thickness of the first insulating film present at the periphery of the sensor hole is in the range of about 2000 to about 5000 angstroms.

The present invention is also directed to the pressure sensor with the above construction, wherein the sensor hole is in the shape of a circle and a diameter thereof is in the range of about 5 to about 40 µm.

The present invention is also directed to the pressure sensor with the above construction, wherein the end edge of the first insulating film rising from a surface of the first electrode located below the cavity is inclined to the first electrode.

The present invention is also directed to the pressure sensor with the above construction, wherein release holes are disposed in the second electrode so as to correspond to the peripheral portion of the first electrode.

The present invention is also directed to the pressure sensor with the above construction, wherein a second insulating film is stacked on the second electrode, and the second insulating film in the vicinity of the center of the sensor section is removed to form an opening.

The present invention is also directed to the pressure sensor with the above construction, wherein the removed portion of the second insulating film in the sensor section is in the shape of a circle and a diameter thereof is in the range of about 24 to about 28 μm.

The present invention is also directed to the pressure sensor with the above construction, wherein an overcoat film is formed on the second electrode in the opening.

The present invention is also directed to the pressure sensor with the above construction, wherein the overcoat film is made of a material different from that of the second insulating film.

The present invention is also directed to the pressure sensor with the above construction, wherein the second insulating film is formed with an inorganic insulating film, and the overcoat film is formed with an organic insulating film.

The present invention is also directed to the pressure sensor with the above construction, wherein the surface of the overcoat film in the central portion of the sensor section is flat.

The present invention is also directed to a method for fabricating a pressure sensor including plural sensor sections arranged in a matrix, the method including the steps of: forming a first electrode in the sensor section; forming an intermediate layer on the first electrode; forming a second electrode on the intermediate layer; forming an overcoat film on the second electrode; forming an insulating film on the overcoat film; removing the intermediate layer to form a cavity; and removing the insulating film present in the central portion of the sensor section to form an opening.

The present invention is also directed to the method for fabricating a pressure sensor with the above construction, including the steps of forming an overcoat film at least in the central portion of the second electrode; forming the second insulating film on the overcoat film; and removing the second insulating film present in the central portion of the second electrode to form an opening.

The present invention is also directed to the method for fabricating a pressure sensor with the above construction, including the step of: forming release holes in the second insulating film and the second electrode so as to overlap the first electrode; removing the intermediate layer through the release holes; and closing the release holes after removal of the intermediate layer.

The present invention is also directed to the method for fabricating a pressure sensor with the above construction, including the step of post-baking the overcoat film at a temperature in the range of about 250 to about 300° C.

BEST MODE FOR CARRYING OUT THE INVENTION

Hereinafter, description will be given of embodiments of the present invention with reference to the accompanying drawings. Note that while in the embodiments, description will be given of a pressure sensor for detecting a fine pattern with plural sensor sections arranged, the present invention is not specifically limited to a pressure sensor for detecting a fine pattern. The present invention may be applied to, for example, either a pressure sensor for detecting a pressure with one sensor section, or a touch panel for detecting the presence/absence of a pushing pressure using plural sensor sections each with a slightly larger size in arrangement. While in the embodiments, description will be given of a construction in which a detection state is identified by the presence/absence of contact between electrodes of a pair in a sensor section, the present invention is effective for an electrostatic scheme in which a detection signal corresponding to spacing between electrodes of a pair is outputted.

Figure 1:
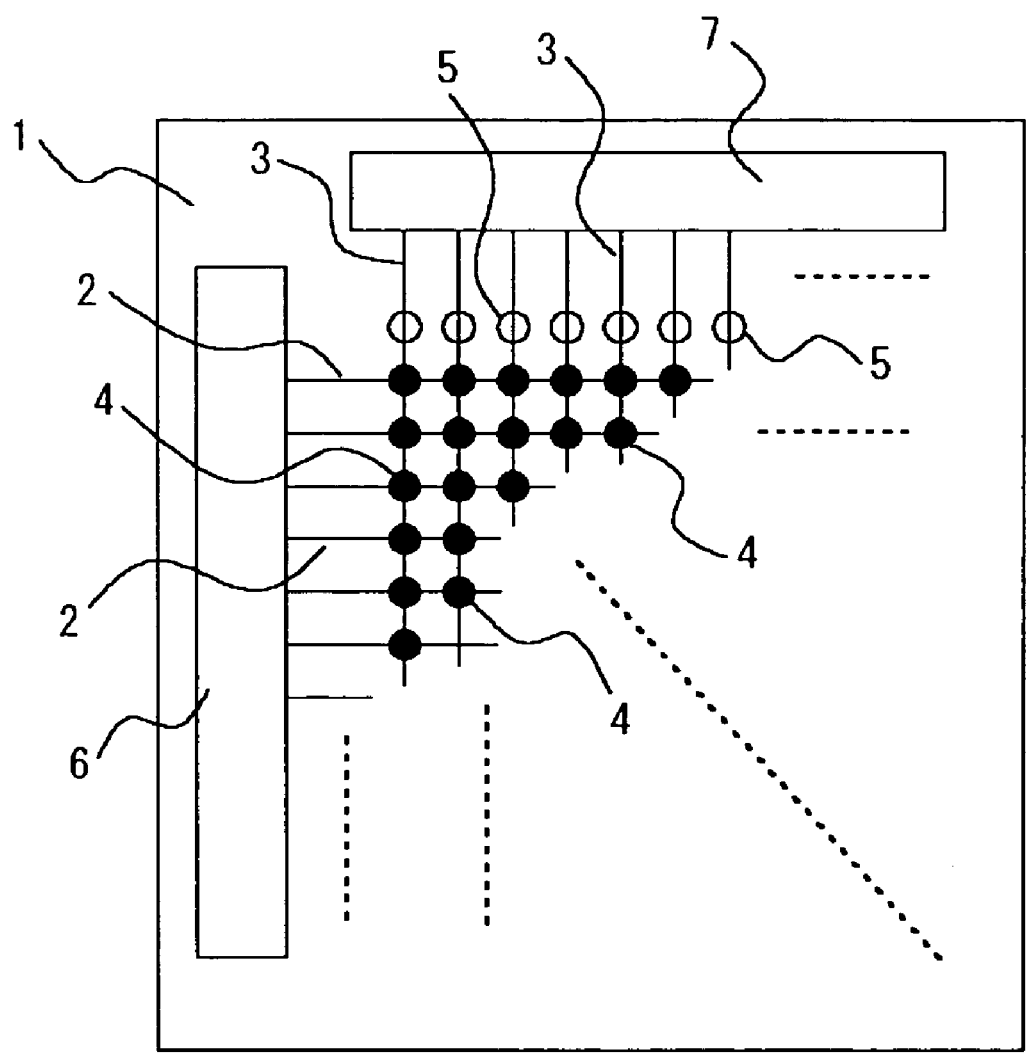
FIG. 1 is an overall view schematically showing pressure sensors according to a first embodiment of the present invention.

At first, description will be given of a first embodiment with reference to the accompanying drawings. FIG. 1 is an overall view schematically showing pressure sensors of the present invention. A numerical symbol 1 indicates a transparent glass substrate, and intersections between plural first wires 2 extending in the row direction and plural second wires 3 extending in the column direction are arranged in a matrix on the glass substrate 1. In this embodiment, while the glass substrate 1 is used as a substrate, a plastic film or the like may also replace it without imposing specific limitation on the glass substrate. A numerical symbol 4 indicates sensor sections each disposed in the vicinity of intersections of the first wires 2 and the second wires 3, and a numerical symbols 5 indicates vent hole sections provided on the respective second wires 3. A region in which the plural sensor sections 4 are arranged in a matrix corresponds to a pressure detection region, which detects a fine pattern, and the vent hole section 5 is provided outside the pressure detection region. Note that there is provided a region for detecting a pattern in a pressure sensor device in which sensor sections 4 are assembled, and the term "pressure detection region" herein means not a region for detecting a pattern in the pressure sensor device, but a region in which the sensor sections 4 exist. The vent hole sections 5 are located on respective extensions in the column direction along which the sensor sections 4 are disposed, wherein two vent hole sections are disposed at both ends of each sensor section group disposed in a line along the column direction. Note that one vent hole section 5 may be disposed adjacent to one end of each sensor group in a line. A numerical symbol 6 indicates a scanning circuit for supplying a scanning signal to the first wires 2, and a numerical symbol 7 indicates a sensing circuit for detecting a signal flowing in the second wires 3.

In the sensor section 4, a detailed construction of which will be described later, a first electrode connected to the first wire 2 and a second electrode connected to the second wire 3 are disposed opposite to each other with a cavity interposed therebetween. The second electrode is curved to the first electrode side so as to match a pressure from a specimen to be eventually brought into contact with the first electrode when a pressure of a predetermined value or more is applied. When the specimen is pushed to the pressure detection region, both electrodes are brought into contact with each other in a sensor section 4 corresponding to a protrusion of the specimen, while both electrodes are kept separated from each other in a sensor section 4 corresponding to a depression of the specimen. If in this situation, a scanning signal is supplied to one of the first wires 2 from the scanning circuit 6, the signal flows into a second wire 3 through both electrodes in a sensor section 4 in which both electrodes are brought into contact, while no signal flows into a second wire 3 in a sensor section 4 in which both electrodes are not brought into contact. Then, if the presence/absence of the signal flowing through a second wire 3 is detected in the sensing circuit 7, pressures imposed on each of the sensor sections 4 can be detected. A scanning signal is supplied sequentially to the first wires 2 from the scanning circuit 6 to thereby scan all of the pressure detection region with the signal once and to detect a pattern.

Figure 2:
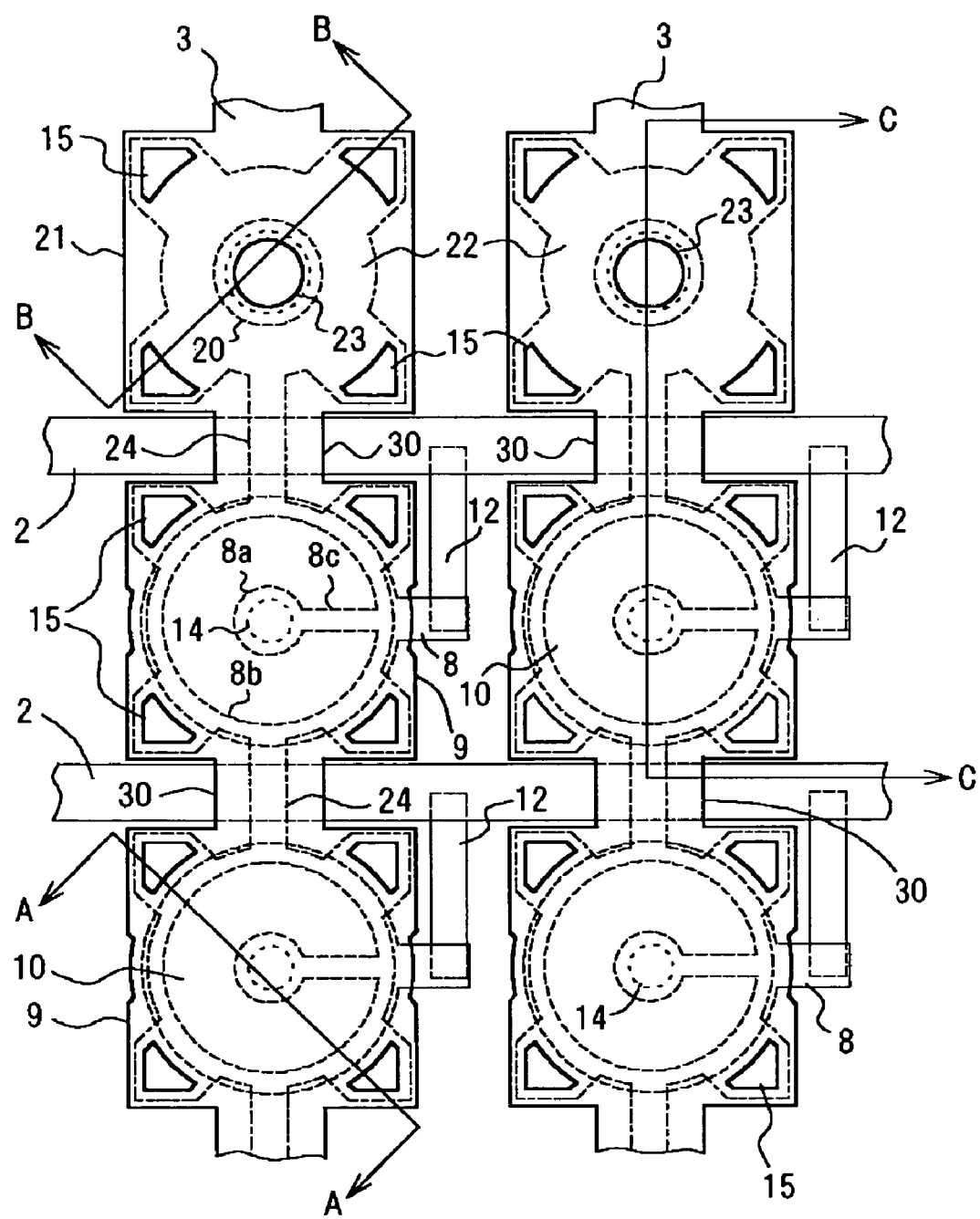
FIG. 2 is a plan view of sensor sections and a vent hole section of the pressure sensor.
Figure 3:
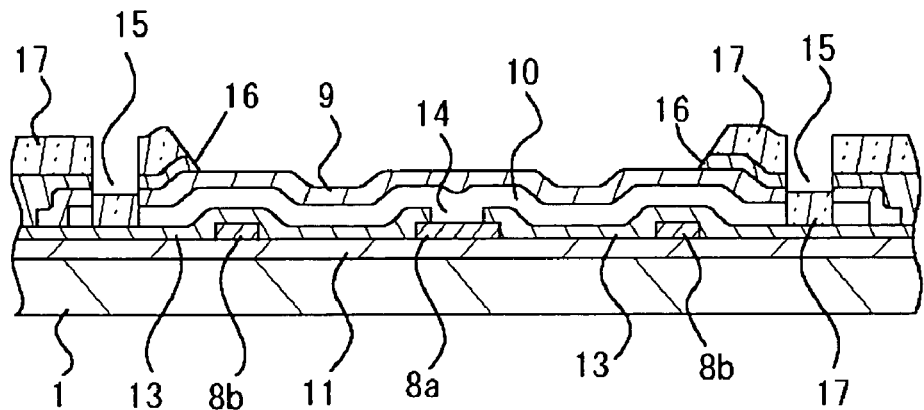
FIG. 3 is a schematic sectional view of the sensor section.
Figure 4:
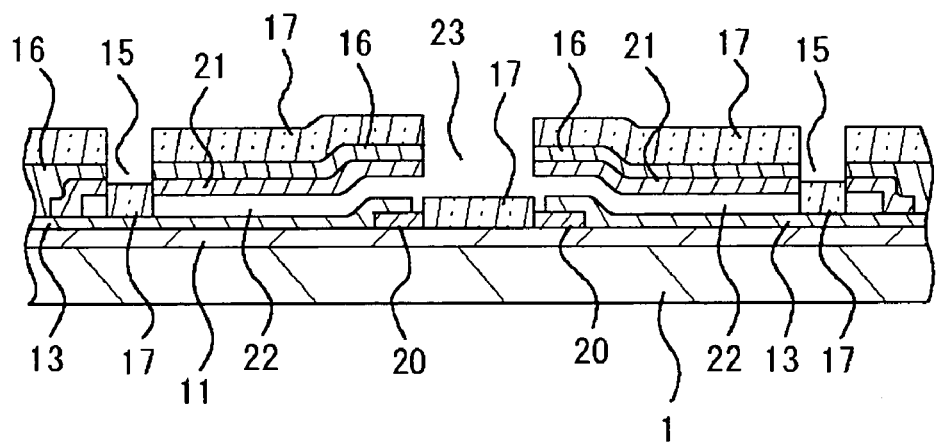
FIG. 4 is a schematic sectional view of the vent hole section.
Figure 5:
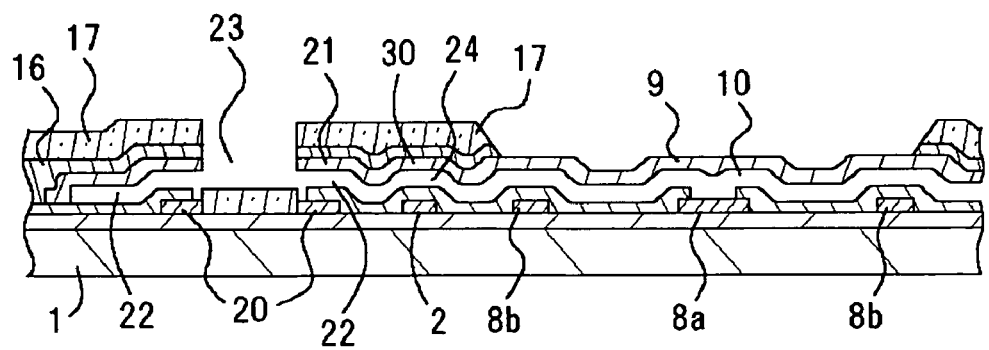
FIG. 5 is a schematic sectional view including the sensor section and the vent hole section.
Figure 6A:
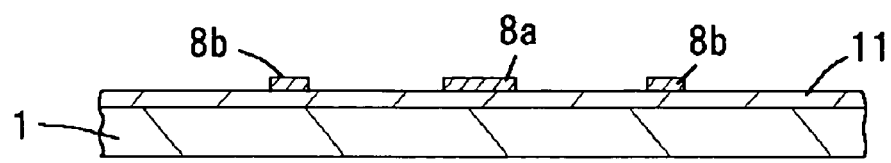
FIGS. 6(a) to 6(h) are sectional views for describing steps of a fabrication process for the sensor section.
Figure 6B:
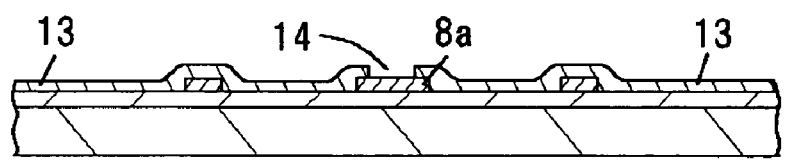
Figure 6C:
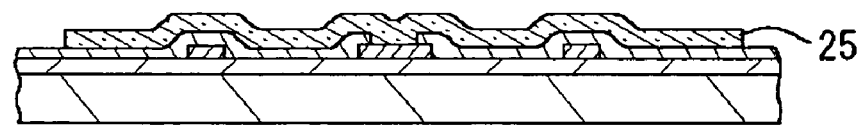
Figure 6D:
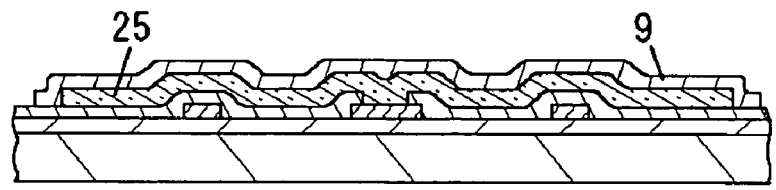
Figure 6E:
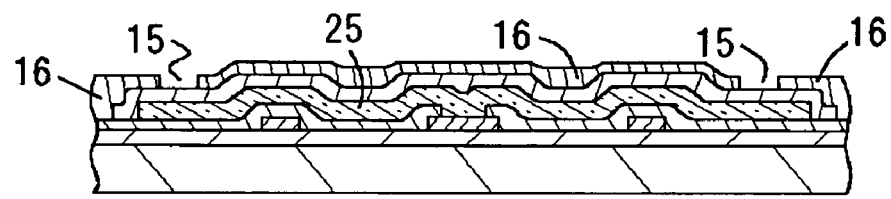
Figure 6F:
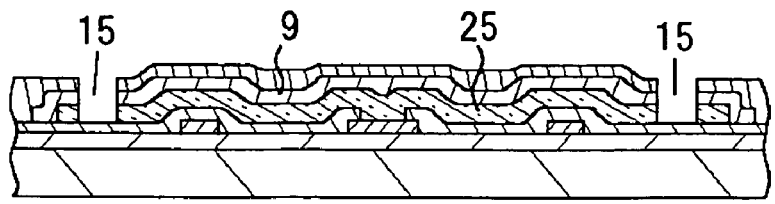
Figure 6G:
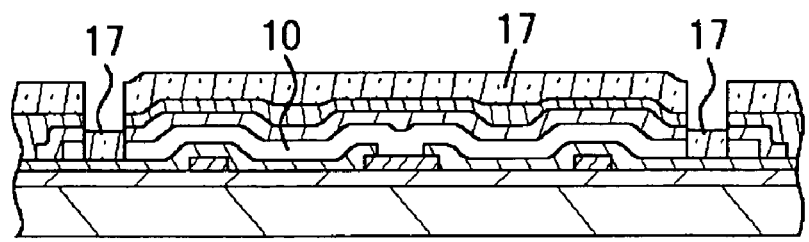
Figure 6H:
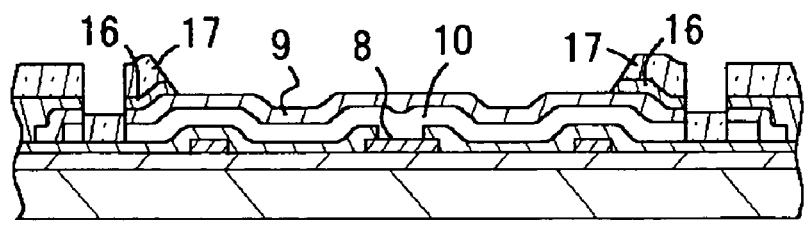
Figure 7A:
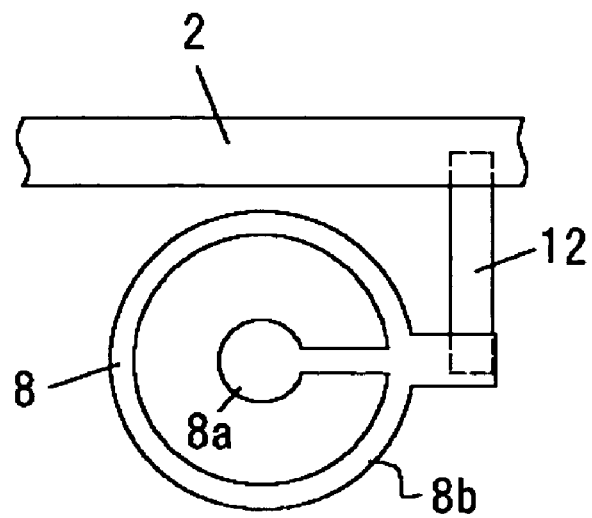
FIGS. 7(a) to 7(f) are plan views for describing steps of the fabrication process for the sensor section.
Figure 7B:
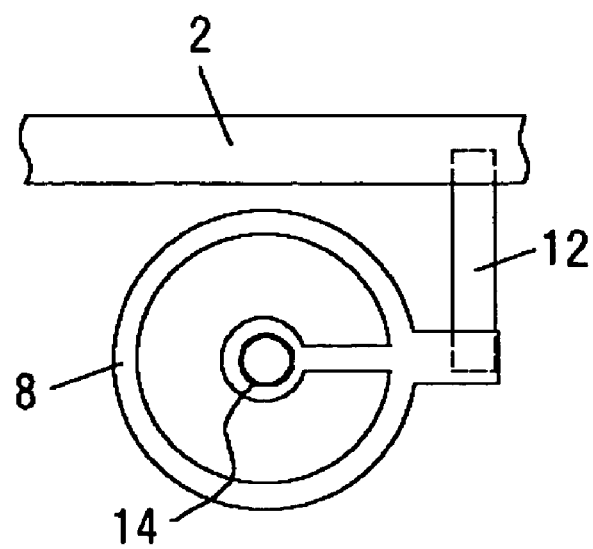
Figure 7C:
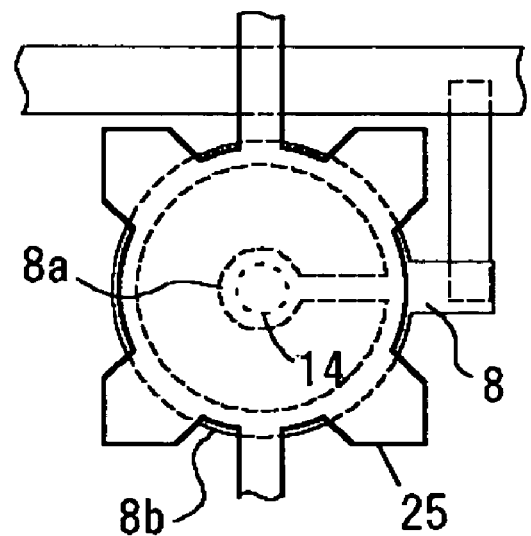
Figure 7D:
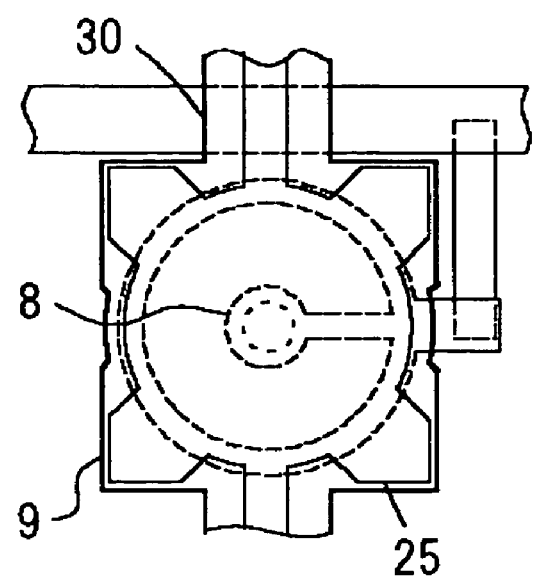
Figure 7E:
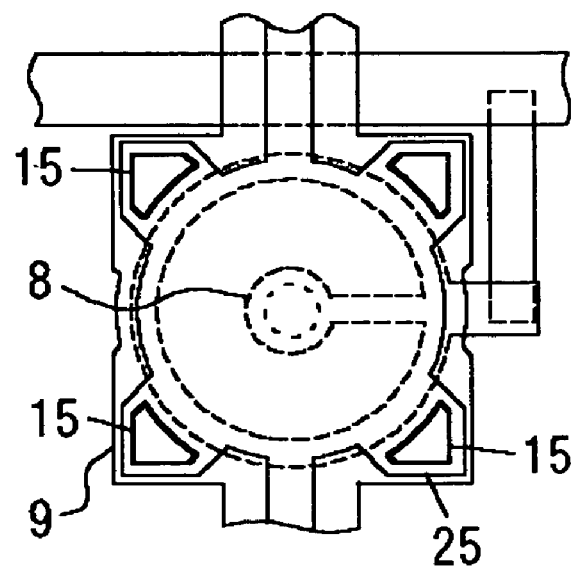
Figure 7F:
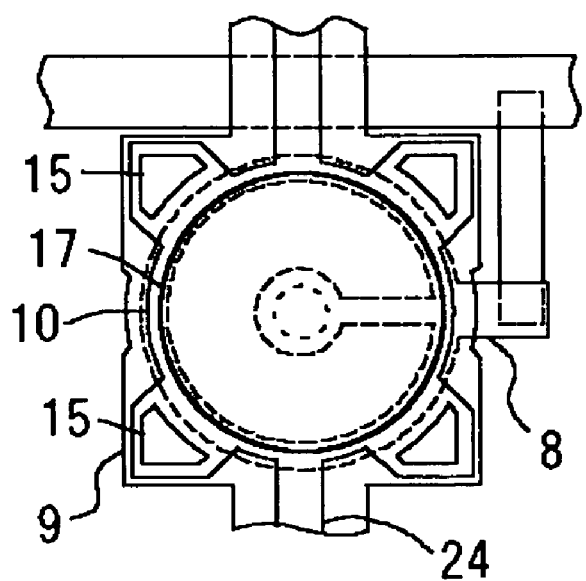

FIG. 2 is a plan view of the sensor sections 4 and the vent hole section 5 of the pressure sensor, FIG. 3 is a sectional view of the sensor section 4 taken along line A-A of FIG. 2, FIG. 4 is a sectional view of the vent hole section 5 taken along line B-B of FIG. 2 and FIG. 5 is a sectional view taken along line C-C of FIG. 2.

First of all, description will be given of a structure of a sensor section 4. A lower-layer insulating film 11 made of SiNx is stacked all over the surface of the glass substrate 1. Plural first wires 2 are disposed in parallel to each other on the lower-layer insulating film 11, and a first electrode 8 is formed in the sensor section 4. The first wire 2 and the first electrode 8 both are formed by patterning a metal layer stacked on the lower-layer insulating film 11. Used as a metal layer is, for example, a layer structure made of Al and Mo. The first electrode 8 includes: a circular portion 8a located in the central portion and corresponding to a central electrode portion of the sensor section 4; an annular portion 8b disposed in the periphery of the sensor section 4; and a connection portion 8c connecting the circular portion 8a and the annular portion 8b thereby. In this embodiment, one annular portion 8b is provided and the annular portion 8b is in the shape of an annularity having the center of the sensor section 4 as that thereof.

A numerical symbol 12 indicates a long, narrow contact layer for electrically connecting the first wire 2 and the first electrode 8, which is made of an amorphous silicon layer, a polycrystalline layer or a metal layer. The contact layer 12 is made of a material higher in resistivity than metals of which the first wire 2 and the first electrode 8 are made. If herein, a resistance value of the contact layer is R, a voltage of a scanning signal supplied to the first wire 2 is E, and a current flowing through the second wire 3 is I by definition, a relation of E=IR is established. Therefore, a signal flowing into a second wire 3 through one sensor section 4 is of a current value of I. A signal flowing through the second wire 3, however, further flows in a sensor section 4, in a first wire 2 having not been scanned, in a sensor section 4 on another column and in a second wire 3 on another column, the scanning signal eventually passes through three contact layers 12 counted from the first wire 2 originally applied with the scanning signal. If a current flowing in the second wire 3 on another column is I' by definition, a relation of E=3RI' is established to thereby give a relation of I'=I/3. Therefore, by measuring current values in the second wires 3, it is determined whether or not a current has passed through other sensor sections 4, thereby enabling a precision of a sensor itself to be improved.

The contact layer 12 is preferably a film a thickness of which can be uniform and on which a pattern can be formed with optical means and, in this case, the contact layer 12 is made of polycrystalline silicon or an amorphous silicon mixed with a conductive impurity, which may be replaced with a switching element or a rectifying element (a diode or the like).

Resistance of the contact layer 12 is determined based on the minimum current value detectable in the sensing circuit 7. In a case where a highly resistant contact layer 12 is employed, wiring resistance is necessary to be reduced. Since a resistance value is proportional to a distance, the larger a distance from the scanning circuit 6, the higher a resistance value to as far as the scanning circuit 6. Hence, in a case where wire resistance from the scanning circuit 6 to a sensor section 4 located at a position farther from the scanning circuit 6 is on the same order as that of the contact layer 12, none of results of the detection in the sensing circuit 7 give proper information on which of the results is a proper value. Therefore, the first wire 2 preferably contains Al or the like low in resistivity.

A numerical symbol 13 indicates a first insulating film made of SiNx, SiO$_2$ or the like and covers the lower-layer insulating film 11 and the first wires 2. The first insulating film 13 also exists in the sensor section 4 and a sensor hole 14 in the shape of a circle is formed in the vicinity of the center of the sensor section 4 to expose the central portion of a circular portion 8a of the first electrode 8. A size and thickness of the sensor hole 14 (a thickness of the first insulating film 13 at the periphery of the sensor hole 14) affect a sensitivity of the sensor.

Since the first insulating film 13 covers the periphery of the circular portion 8a of the first electrode 8, the second electrode 9 is not brought into close contact with the first electrode 8 at a large area and, after the second electrode 9 is brought into contact with the first electrode 8, the second electrode 9 starts being separated from the first electrode 9 from a point in the vicinity of the first insulating film 13. The thicker the first insulating film 13, the second electrode 9 restores the original state with more of ease even if elasticity of the second electrode 9 is weaker, with a lower possibility that the second electrode 9 is brought into contact with the first electrode 8.

In a case where the sensor hole 14 is larger, an exposed portion of the first electrode 8 increases, which results in a higher possibility of the first electrode 8 being brought into contact with the second electrode 9. Therefore, detection of a lower pressure imposed onto the sensor section 4 can be realized, whereas overdetection is easier to occur by increase in sensitivity to detect a low pressure. Contrary thereto, in a case where the sensor hole 14 is smaller, an exposed portion of the first electrode 8 decreases, which results in a lower possibility of the first electrode 8 being brought into contact with the second electrode 9; therefore, the sensor is more insensitive to a pressure by decrease in possibility of the contact.

Therefore, a thickness of the first insulating film 13 and a size of the sensor hole 14 are appropriately set so as to match a required sensitivity of the pressure sensor. In order to obtain a pressure sensor capable of detecting a pattern with a good precision, it is necessary that a thickness of the first insulating film 13 is in the range of about 500 angstroms to about 10000 angstroms and a diameter of the sensor hole 14 is in the range of about 5 μm to about 40 μm. A thickness of the first insulating film 13 is more preferably in the range of about 2000 angstroms to about 5000 angstroms. Note that the sensor hole 14 may be polygonal, in which case the sensor hole 14 may be in the shape of a square having a side in the range of about 5 μm to about 40 μm in length.

The first electrode 8 exposed from the first insulating film 13 is disposed opposite to the second electrode 9 with the cavity 10 interposed therebetween. The cavity 10, of which a forming method will be described later, extends to as far as the annular portion 8b of the first electrode 8 in the horizontal direction of the sensor section 4. Release holes 15 are provided at four corners of the sensor section 4 and the cavity 10 extends to the release holes 15.

The second electrode 9 is formed with a metal layer and, for example, Mo is used as a metal of the layer. In the sensor section 4, the second electrode 9 is patterned into a square of 50 μm×50 μm in size and the release holes 15 are opened at the four corners. In the sensor sections 4 disposed in the column direction, a connection portion 30 is formed that electrically connects between the second electrodes 9 of sensor sections 4 adjacent to each other, and the second electrodes 9 and connection portions 30 play a second role as the second wire 3. The connection portion 30 is narrower in width than the second electrode 9, and is overlapped with the first wire 2 through the first insulating film 13 in an orthogonal direction. Description will be given of a fabrication process for the second electrodes 9 and the connection portions 30 later, which are formed by patterning the same metal layer.

Since the second electrodes 9 work as the second wires 3 as well, no necessity arises for special wires dedicated to the second wires to be provided. Therefore, it is possible to increase an area occupied by the sensor sections 4 in the pressure detection region and a space in the pressure detection region can be more effectively used.

The second electrode 9 has an almost uniform film thickness with a profile of depression and protrusion combined since a surface of an intermediate layer 25 described later assumes a profile of depression and protrusion combined in conformity with a shape of the first electrode 8. That is, macroscopically, the portions located opposite to the circular portion 8a and annular portion 8b are protruded and the other portions are depressed. In such a way, since the second electrode 9 has globally a surface profile of depression and protrusion combined, the second electrode 9 is reinforced to thereby increase its restoring force. Even if a strong pressure acts on the second electrode 9, a stress is distributed in the whole of the second electrode 9 so as to raise its strength to thereby reduce a possibility of the second electrode 9 being broken with an improved durability.

A numerical symbol 16 indicates a second insulating film and a numerical symbol 17 indicates a protective film, which films are stacked on the first insulating film 13 and the second wire 2. In this embodiment, both films are made of SiNx. Note that a material of the films 16 and 17 are not specifically limited to SiNx, and may be $SiO_2$ or an organic insulating material such as polyimide, polyacrylate or the like. Though details will be given later, the second insulating film 16 and the protective film 17 are formed individually in respective separate steps. The release holes 15 are formed in the second insulating film 16 and the protective film 17 is formed on the second insulating film 16 after formation of the release holes 15; therefore the release holes 15 are closed with the protective film 17. The protective film 17 closing the release holes 15 and the protective film 17 stacked on the second insulating film 16 are simultaneously formed, but both are not continuous and separated. The protective film 17 closing the release hole 15 corresponds to a closed portion. Note that if a thickness of the protective film 17 is increased in excess of the depth of the release hole 15, the protective film 17 in the release hole 15 and that on the second insulating film 16 become continuous.

In the sensor section 4, the second insulating film 16 and the protective film 17 on the second electrode 9 are removed so as to form an empty circle surrounded with both films to thereby expose the second electrode 9. Since the second electrode 9 is curved at the boundary between the exposed portion and the surrounding second insulating film 16 as a supporting point, a flexibility of the second electrode 9 changes according to the magnitude of an area where the second insulating film 16 is removed. If the second insulating film 16 is removed in a larger area, the second electrode 9 is easier to be curved and when a protrusion of a specimen is brought into contact with the second electrode 9, the second electrode 9 is curved to contact the first electrode 8; therefore, the sensor section 4 is more sensitive to a pressure. Contrary thereto, if the second insulating film 16 and the protective film 17 on the second electrode 9 are removed in a smaller area, the second electrode 9 is harder to be curved correspondingly; therefore, the sensor section 4 is less sensitive to a pressure. Easiness in curving of the second electrode 9 affects a sensitivity of the sensor section 4, and the more sensitive the sensor section 4 is to a pressure, a pattern of the specimen is detected more indefinite due to overdetection of the pressure, while on the other hand, the less sensitive the sensor section 4 is to a pressure, there arises a portion of the specimen where a fine pattern thereof cannot be detected and a pattern of the specimen is detected with less of sharpness. Therefore, excessive sensitivity or excessive insensitivity contributes to increase in possibility of erroneous detection, which necessitates a design in which easiness in curving of the second electrode 9 is properly set. If the boundary between a removed area of the second insulating film 16 and the rest of the film is set so as to be located inside the annular portion 8b on the outermost side of the first electrode 8, a flexibility and restoring force of the second electrode 9 fall within proper ranges.

The second insulating film 16 and the protective film 17 in the form of a thin film present on the second electrode 9 play roles of reinforcement and protection, which reduces breakage of the second electrode 9 to some extent corresponding to the reinforcement and protection. While in this embodiment, the second insulating film 16 and the protective film 17 are removed partly in an area to the full depth thereof, the second insulating film 16 and the protective film 17 may be removed partly in an area part way deeply in the thickness so that a central portion is thinner than the rest. In the latter case, the thinner portion is preferably in the shape of a circle with the center of the sensor section 4 as the center thereof Note that while in this embodiment, the second insulating film 16 is removed in a circle, the film may be removed in a tetragon.

An area on the second electrode 9 in which the second insulating film 16 is removed to the full depth or deeply part way in the thickness is preferably in the range of about 5 μm to about 40 μm in a diameter in a case of a circle. The area is more preferably in the range of about 24 μm to about 28 μm in a diameter in the case of a circle. Note that in a case of a tetragon, the area is preferably in the shape of a square having a side in the range of about 5 μm to about 40 μm in length.

Then, description will be given of the vent hole section 5. A numerical symbol 20 indicates a dummy electrode positioned in the vicinity of the center of the vent hole section 5 and formed on the lower-layer insulating film 11. The dummy electrode 20 is a metal layer in the shape of a doughnut having an opening in the center thereof and formed in the same step as the first wire 2 and the first electrode 8. Therefore, for example, a metal layer of a layer structure made of Mo and Al is stacked all over the surface of the lower-layer insulating film 11, and the metal layer is patterned to form the dummy electrode 20, the first wire 2 and the first electrode 8 simultaneously. The dummy electrode 20 is not electrically connected to the first wire 2 and formed isolatedly. The first insulating film 13 is stacked so as to cover the lower-layer insulating film 11 and the dummy electrode 20, and is removed in the vicinity of the center of the vent hole section 5 to expose parts of the lower layer insulating film 11 and the dummy electrode 20.

A numerical symbol 21 indicates an auxiliary electrode located in the vent hole section 5, and the auxiliary electrode 21 is a metal layer made of Mo and the like similar to the first second electrode 9 of the sensor section 4 and formed in the shape of a square having a size of 50 μm×50 μm, and the release holes 15 are formed in the metal layer at four corners thereof. The auxiliary electrode 21 of the vent hole section 5 is analogous to the second electrode 9 of the sensor section 4 in the shape, while having no function to detect a pattern and exists as part of the second wire 3. A second cavity 22 is provided between the auxiliary electrode 21 and the first insulating film 13 and communicates with the cavity 10 of the sensor section 4 to make both cavities 10 and 22 to be ventilatable therebetween. The second insulating film 16 is stacked on the auxiliary electrode 21 and the release holes 15 are provided therein in a similar manner to that in the auxiliary electrode 21.

A vent hole 23 passing through the auxiliary electrode 21 and the second insulating film 16 is formed in the center of the vent hole section 5. The dummy electrode 20 and the first insulating film 13 are not present in a place corresponding to the vent hole 23. When the protective film 17 is stacked on the second insulating film 16, the release holes 15 is closed with part of the protective film 17 to thereby disconnect a communicating state with the second cavity 22, while since in the vent hole 23, the protective film 17 is stacked on the lower-layer insulating film 11, the communicating state with the second cavity 22 are maintained. In the vent hole section 5, the second insulating film 16 and the protective film 17 on the auxiliary electrode 21 are not removed and remain as they are. Therefore, curving in the auxiliary electrode 21 is restricted by the second insulating film 16 and the protective film 17, the peripheral area of the vent hole 23 is reinforced and, thereby, the vent hole 23 continues to communicate with the second cavity 22 even during fabrication or operation thereof.

A numerical symbol 24 indicates a communication path hollow in the interior to ventilate air therein, the communication path is located between the vent hole section 5 and the sensor section 4 and between adjacent sensor sections 4, and communicates between the cavities 10 in the sensor sections 4 and between the cavity 10 of the sensor section 4 and the second cavity 22 of the vent hole section 5. The communication path 24 is constructed with the first insulating film 13 at the bottom and with the auxiliary electrode 21, which is a metal layer of the second wire 3, at the side surfaces and the top surface. The cavities 10 of the sensor sections 4 and the second cavities 22 of the vent hole sections 5 spatially communicate with each other by the communication paths 24 and the outside air can be ventilated through the vent holes 23. Since a lateral width of the communication path 24 is narrower than that of the cavity 10, dust coming from the vent hole 23 can be prevented from intruding into the cavity 10 through the communication path 24.

With such a construction, even after the release holes 15 are closed with the protective film 17, the cavity 10 of the sensor section 4 can be kept at almost the same pressure as the outside air pressure. Therefore, no large load is imposed on the second electrode 9 of the sensor section 4 during a step of creating a vacuum, thereby enabling the second electrode 9 from being broken. Since the vent hole section 5 is provided separately from the sensor sections 4, dust is prevented from intruding into the cavity 10 of the sensor sections 4, thereby enabling a pressure sensor with fewer troubles to be obtained. Note that the vent holes 23 may be finally closed so that dust intrudes from the vent hole sections 5 during operation of a pressure sensor.

Then, description will be given of steps of a fabrication process for the sensor section 4 based on accompanying drawings. FIGS. 6(*a*) to 6(*f*) are sectional views (corresponding to the sectional view of FIG. 3) showing steps of the fabrication process for the sensor section 4 and FIGS. 7(*a*) to 7(*h*) are plan views showing steps of the fabrication process for the sensor section 4.

The lower-layer insulating film 11 made of SiNx is stacked on the glass substrate 1 and an Si layer is stacked on the lower-layer insulating film 11. The Si layer is annealed into a polycrystalline state and, thereafter, a photographic method is applied to the Si layer to leave the Si layer corresponding to the contact layer 12. Thereafter, a metal layer of a layer structure made of Mo and Al is formed on the lower-layer insulating film 11 by means of a sputtering method or the like to form the first wire 2 and the first electrode 8 as shown in FIGS. 6(*a*) and 7(*a*) according to a photolithographic method.

Then SiNx is stacked on the lower-layer insulating film 11 and the first wire 2 to form the first insulating film 13. A portion of the first insulating film 13 corresponding to the circular portion 8*a* is removed in an etching step. The first insulating film 13 on the circular portion 8*a* is removed in a circle as shown in FIGS. 6(*b*) and 7(*b*) to form the sensor hole 14. In such a way, a central portion of the circular portion 8*a* is exposed, while the first insulating film 13 covers the peripheral portion of the circular portion 8*a*. A proportion of the first insulating film 13 present on the circular portion 8*a* affects a sensitivity of the pressure sensor.

Then, a metal layer made of Al is stacked on the first insulating film 13 and the exposed first electrode 8. Thereafter, the metal layer is patterned in a predetermined shape according to a photolithographic method or the like to form the intermediate layer 25. While the intermediate layer 25 is finally removed, a space occupied by the intermediate layer 25 becomes the cavity 10 and the communication path 24. Therefore, the intermediate layer 25 shown in FIGS. 6(*c*) and 7(*c*) is formed in the sensor section 4. The intermediate layer 25 includes: an almost circular portion covering from the circular portion 8*a* to the annular portion 8*b* of the first electrode 8; and portions protruding therefrom up to the release holes 15 at four sites. Narrow, long intermediate layers 25, which corresponds to a communication path 24 are present between adjacent sensor sections 4 and between a sensor section 4 and a vent hole section 5. Therefore, intermediate layers 25 present between each of sensor sections 4 and vent hole sections 5 arranged in the column direction continuously extends as a single piece without disconnection. Note that shapes, thickness or the like of the intermediate layers 25 are designed so as to be adapted for desired shapes and sizes of a cavity 10 and a communication path 24.

Then, a metal layer is stacked on the intermediate layer 25 and the first insulating film 13 by means of a sputtering method. The metal layer is of a layer structure made of Mo and Al. The intermediate layer 25 in the sensor section 4 has a surface with a profile of depression and protrusion combined in conformity with the shape of the first electrode 8. A resist is coated on the metal layer and applied with exposure, development and etching according to a photographic method to thereby form the second electrodes 9 and the second wire 3 including the connection portions 30. In this situation, the intermediate layer 25 is in a state of being covered perfectly with the metal layer of the second wire 3. As shown in FIGS. 6(*d*) and 7(*d*), the second electrode 9 in the shape of an almost tetragon perfectly covering the intermediate layer 25 is formed at an almost uniform film thickness and the second electrode 9 assumes a profile of depression and protrusion combined in conformity with a profile of depression and protrusion combined of a surface of the intermediate layer 25. In this step, no release hole 15 is formed in the second electrode 9. The intermediate layer 25 corresponding to the communication path 24 is covered with the connection portion 30 and the second electrode 9 is electrically connected to the second electrode 9 in an adjacent sensor section 4 by the connection portion 30.

Then, SiNx is stacked on the second electrode 9 and the first insulating film 13 to form the second insulating film 16 As shown in FIGS. 6(*e*) and 7(*e*), SiNx in portions corresponding to the release holes 15 is removed. The portions from which the second insulating film 16 is removed exposes part of the second electrode 9.

Then, etching treatment is applied to remove both materials of Mo and Al. A metal layer in a portion exposed without coverage of the second insulating film 16 is removed by this etching treatment. As etching methods, there can be used both of dry etching and wet etching. For example, Mo and Al can both be etched off by using a mixture of phosphoric acid, nitric acid and acetic acid as an etching solution. With this etching treatment applied, as shown in FIG. 6(*f*), the second electrode 9 and the intermediate layer 25 in a portion corresponding to the release holes 15 are removed.

Then, etching treatment is applied to remove only the intermediate layer 25. In this step, a wet etching solution is adopted, and a mixture of hydrochloric acid, phosphoric acid and water is used as an etching solution. The etching solution reaches the intermediate layer 25 through the release hole 15 to etch off the intermediate layer 25 from the end thereof sequentially into the interior. In a case of use of an etching solution of a mixture of hydrochloric acid:phosphoric acid:water=1:5:1 in mixing ratio, a galvanic effect occurs between Al in the intermediate layer 25 and Mo of which the second wire 3 or the like is made to thereby etch off Al in a short time. In a case where Al is aggressively etched off with the galvanic effect, an etching solution especially containing phosphoric acid in volume five or more times that of hydrochloric acid exerts the effect, whereas in a case of use of an etching solution of a mixture of hydrochloric acid:phosphoric acid=1:5 in mixing ratio, a lot of gas bubbles are generated simultaneously during etching. To cope with such generation of gas bubbles, studies have been conducted with experiments with the results that in a case of use of an etching solution of a mixture of hydrochloric acid:phosphoric acid:water=1:10:1, Al can be aggressively etched off in a short time with fewer gas bubbles generated. With this etching treatment adopted, the intermediate layer 25 can be surely removed to form the cavity 10 and the communication path 24 (FIG. 6(*g*)).

Thereafter, SiNx is stacked on the second insulating film 16 to form the protective layer 17. SiNx is formed by means of, for example, CVD and is stacked all over the surface of the glass substrate 1 at almost the same thickness. In this step, since the second insulating film 16 or the like does not exist in the release hole 15, the protective film 17 is stacked on the first insulating film 13. A thickness of the protective film 17 is set to a thickness of the order of a value at which the release hole 15 is closed. Since the cavity 10 is formed with the intermediate 25, a thickness of the intermediate layer 25 is a thickness of the cavity 10, and a thickness in the cavity 10 are almost uniform. A thickness of the cavity 10 corresponds to a distance from the bottom of the lower space of the release hole 15 to the release hole 15. Therefore, if a thickness of the cavity 10 is d1 and a thickness of the protective film 17(*a* closed portion) closing the release hole 15 is d by definition, the release hole 15 can be closed with certainty if a relation of $d1 \leq d$ is established. By stacking the protective film 17 satisfying this condition, the release hole 15*is* closed as shown in FIG. 6(*g*), dust can be prevented from intruding into the cavity 10 through the release hole 15.

Thereafter, as shown in FIGS. 6(*h*) and 7(*f*), removed are the second insulating film 16 and the protective film 17*on* the second electrode 9*in* the sensor section 4. The second insulating film 16 and the protective film 17 are removed in a region covering the circular portion 8*a* to the annular portion 8*b* of the first electrode 8 and, thereby, the second electrode 9*in* the region is easier to be curved. With such a construction adopted, the sensor section 4 sensitive to a pressure can be formed.

Figure 8:
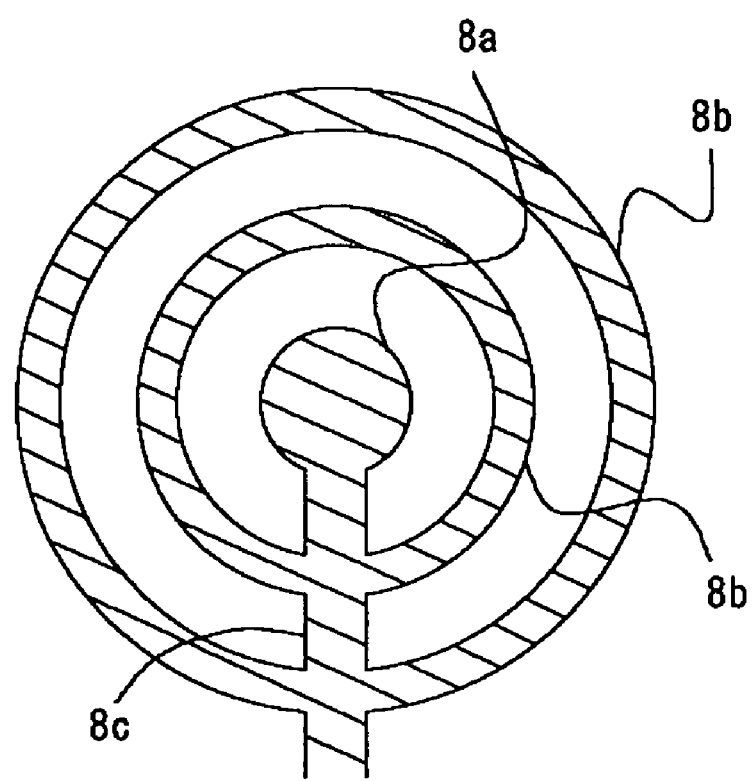
FIG. 8 is a plan view of a first electrode according to a second embodiment of the present invention.

Then, description will be given of a second embodiment of the first electrode 8 based on FIG. 8. FIG. 8 is a plan view of the first electrode 8*in* the sensor section 4. In the embodiment, a shape of the first electrode 8 is different from that in the first embodiment and the other parts of the construction are the same as in the first embodiment; therefore, description thereof will not be repeated herein. The first electrode 8 of the second embodiment has a circular portion 8*a* located at the center of a sensor section 4, two annular portions 8*b* enclosing the circular portion 8*a*, and a narrow, long connection portion 8*c* connecting between the circular portion 8*a* and the two annular portions 8*b*. The annular portions 8*b* in this embodiment are concentric circles with the center of the sensor section 4 as the common center thereof and two rings different in diameter from each other. The outermost annular portion 8*b* is of the same size as the annular portion 8b of the first embodiment and a diameter thereof is set to a value slightly shorter than a side of the sensor section 4.

The second electrode 9 has a surface profile of depression and protrusion combined in conformity with a shape of the first electrode 8, and portions corresponding to the circular portion 8a, the two annular portions 8b and the connection portion 8c of the first electrode 8 assume protrusions and portions under which no part of the first electrode 8 exists assume depressions. In this embodiment, a pair of depression and protrusion increases in the two annular portions 8b of the first electrode 8 and thereby a pair of depression and protrusion increases in the second electrode 9, which enhances a strength of the second electrode 9 to thereby increase a restoring force thereof, as compared with the profile in the first embodiment. In this construction, if no first insulating film 13 is provided on the first electrode 8, not only the circular portion 8a but also the two annular portions 8b can electrically contact the second electrode 9 to improve a sensitivity. While in the second embodiment as well, a second insulating film 16 covers the second electrode 9 except the central portion thereof, the outline of a portion covered by the second insulating film 16 is located between the two annular sections 8b. If the first electrode 8 has three or more annular portions 8b, the outline of a portion covered by the second insulating film 16 is located between the outermost annular portion 8b and the second outermost annular portion 8b.

Figure 9:
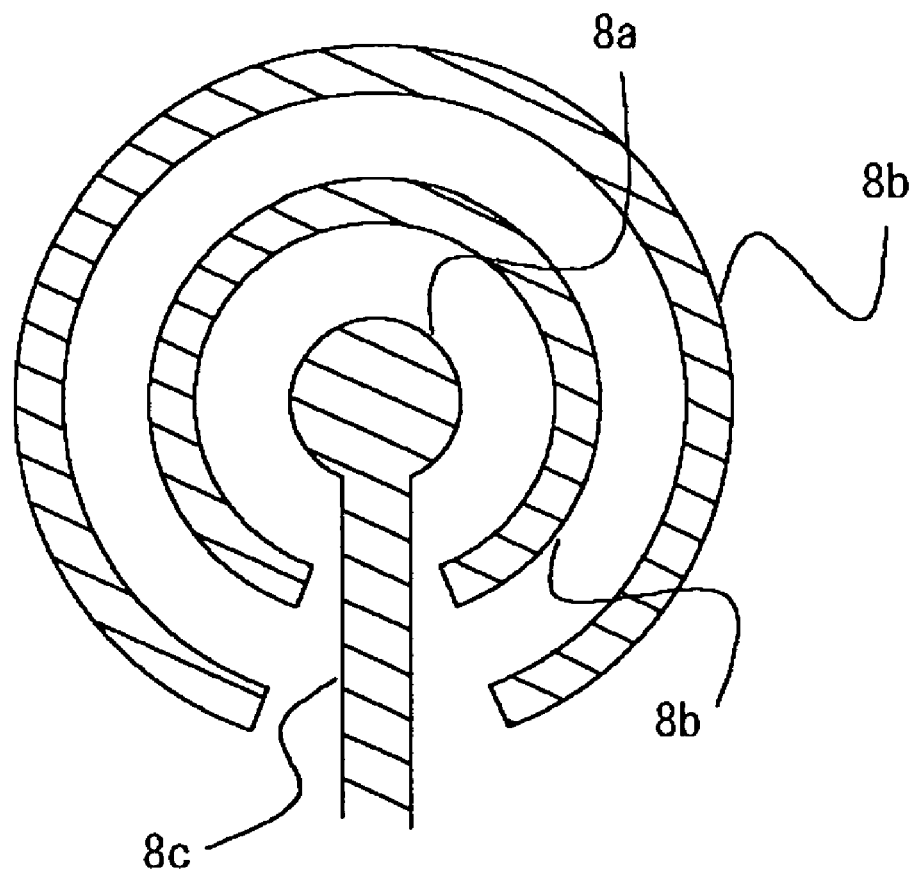
FIG. 9 is a plan view of a first electrode according to a third embodiment of the present invention.

Then, description will be given of a third embodiment of the first electrode 8 based on FIG. 9. While the third embodiment is different from the first electrode 8 of the first embodiment in shape, the other parts of the construction are the same as those in the first embodiment. The first electrode 8 in the third embodiment is analogous to that in the second embodiment but two annular portions 8b are separated from the circular portion 8a. A scanning signal on the first wire 2 is supplied to the circular portion 8a through a connection portion 8c, but the annular portions 8b are electrically separated therefrom, therefore, the scanning signal is not supplied thereto, and the annular portions 8b are used for the purpose of acquiring a profile of depression and protrusion combined in the second electrode 9. Since in the first electrode 8, the annular portions 8b does not participate in detection of a pattern, a sensitivity is lowered. Since with a low pressure applied, no electric contact arises between the first electrode 8 and the second electrode 9, a possibility of erroneous detection is reduced.

The first electrode 8 of the present invention is not limited to the embodiments and the present invention can be applied to other shapes of the first electrodes 8. The second electrode 9 is provided with a surface profile of depression and protrusion combined along with the surface profile of the first electrode 8 to thereby improve a restoring force.

Figure 10:
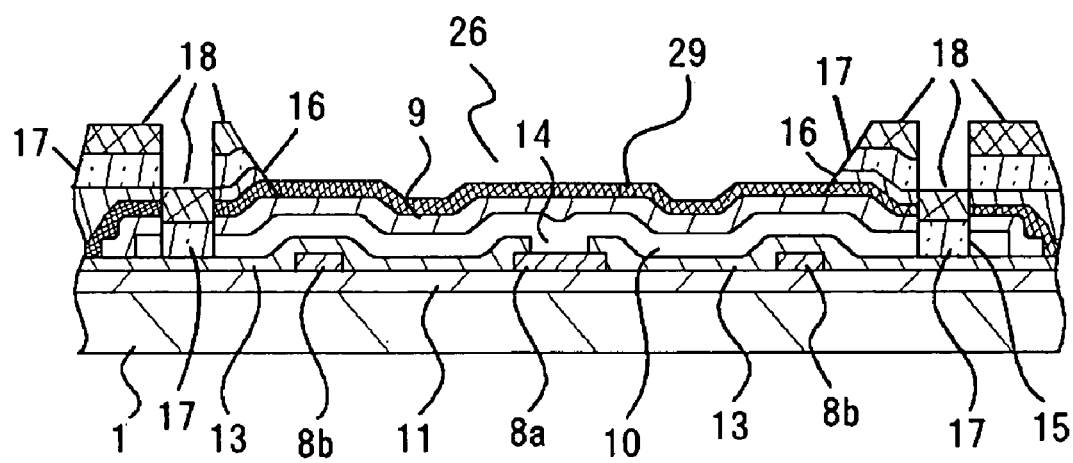
FIG. 10 is a schematic sectional view of a sensor section according to a fourth embodiment of the present invention.

Then, description will be given of a fourth embodiment based on accompanying drawings. FIG. 10 is a sectional view of the sensor section 4 and corresponds to the sectional view taken along line A-A of FIG. 2. Note that in this embodiment, an overcoat film is provided on a second electrode and a main construction including a sensor section 4 and others is the same as that of the first embodiment. Therefore, descriptions of common parts of the construction will not be repeated herein.

A numerical symbol 29 indicates an overcoat film, and the overcoat film 29 covers the second electrode 9. A numerical symbol 16 indicates a second insulating film and a numerical symbol 17 indicates a protective film, and the second insulating film 16 and the protective film 17 are stacked on the overcoat film 29. The overcoat film 29 is formed with an organic film such as a polyimide film, and the second insulating film 16 and the protective film 17 are formed with SiNx. Note that any insulating film can be used as the second insulating film 16 and the protective film 17 without specifically limiting the material to SiNx and may be formed with $SiO_2$, or an organic film formed with polyimide, polyacrylate or the like. The overcoat film 29 is not specifically limited to a polyimide film and may be an organic insulating film formed with a novolak resin film or the like; an inorganic insulating film formed with SiNx or $SiO_2$; a semiconductor film formed with α-Si or the like; and a conductive film formed with ITO or IZO. Though an opening is formed in the second insulating film 16 on the second electrode 9, no opening is formed in the overcoat film 29; therefore, the overcoat film 29 may be formed with a material different from that of the second insulating film 16. If a conductive layer is used as the overcoat film 29, the independent overcoat films 29 are formed individually on the respective sensor sections 4. Since the overcoat film 29, together with the second electrode 9, remains in the vicinity of the center of the sensor section 4, the overcoat film 29 may be formed so as to have flexibility and elasticity similar to those of the second electrode 9. Therefore, the overcoat film 29 is formed to a relatively small thickness. Note that while in this embodiment, the overcoat film 29 is formed as one layer, the film may be formed so as to have two thin layers.

The overcoat film 29 is formed as follows. A photosensitive polyimide is coated on the second electrode 9 as the overcoat film 29 to obtain a uniform film with a spinner. The organic film is cured in exposure treatment applied on portions except release holes 15 and a vent hole 23 and development treatment is applied to remove the organic film corresponding to the release holes 15 and the vent hole 23. While the overcoat film 29 is also formed in portions other than the second electrode 9, the film may be formed only on the second electrode 9.

In the sensor section 4, the second insulating film 16 and the protective film 17 on the second electrode 9 are removed in an circular area to form an opening 26. In the opening 26, there exist the second electrode 9 and the overcoat film 29. Therefore, the second electrode 9 is easier to be curved and, when a protrusion of a specimen is brought into contact with the second electrode 9, the second electrode 9 is curved to thereby contact the first electrode 8, which realizes the sensor section 4 sensitive to a pressure. Contrary thereto, in a case where the second insulating film 16 and the protective film 17 are left as stacked on the second electrode 9, the second electrode 9 is harder to be curved because of the presence of both films, which results in the sensor section 4 insensitive to a pressure. Easiness in curving of the second electrode 9 affects a sensitivity of the sensor section 4 and with more of sensitivity to a pressure of the sensor section 4, a pressure is overdetected, which makes an outline of the specimen indefinite, while on the other hand, with more of insensitivity to a pressure of the sensor section 4, there arises a portion of the specimen not to be detected, which makes the specimen detected in unsharpness. Accordingly, since not only excessive sensitivity but also excessive insensitivity increase a possibility of erroneous detection, a necessity arises for a size of the opening 26 to be designed so as to achieve proper easiness in curving of the second electrode 9. Note that while in this embodiment, the opening 26 is circular, other shapes such as a tetragon and the like may be adopted.

A numerical symbol 18 indicates a sealing material formed with an organic insulating film made of polyimide or the like and stacked on the protective film 17. The sealing material 18 finally closes the vent hole 23 of the vent hole section 5 and is removed in the opening 26. Note that SiNx or $SiO_2$ may also be used as the sealing material 18.

Figure 11:
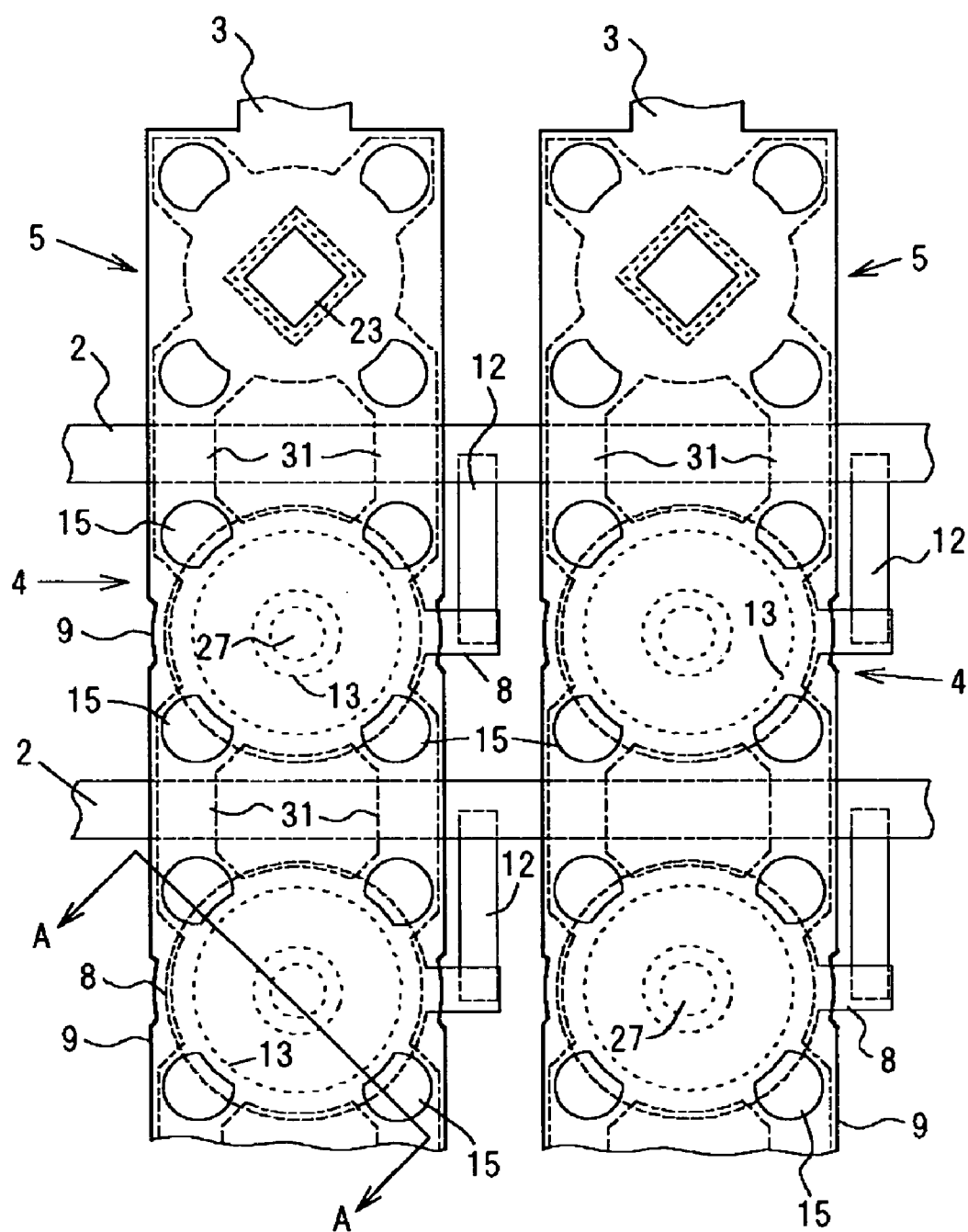
FIG. 11 is a plan view of a sensor section according to a fifth embodiment of the present invention.
Figure 12:
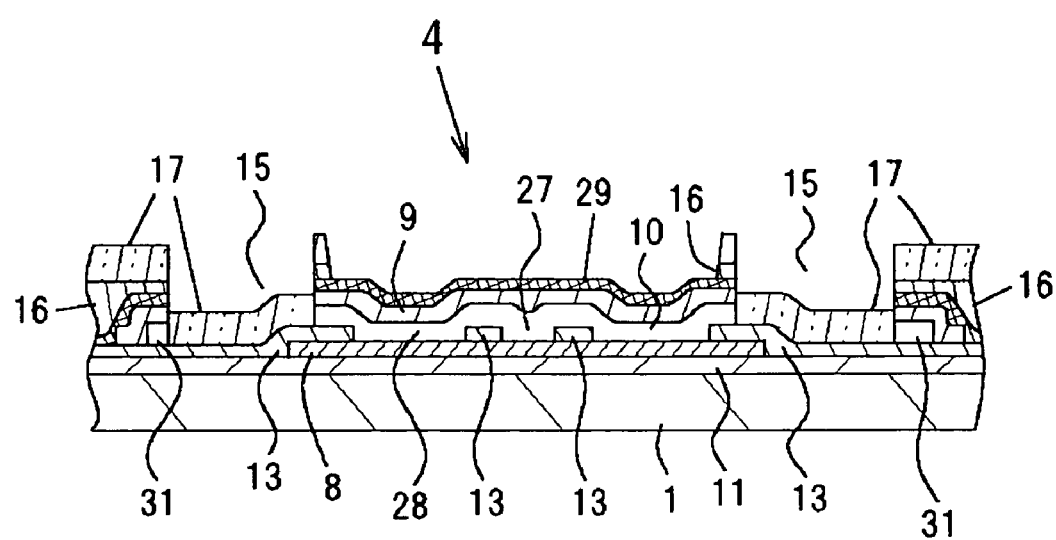
FIG. 12 is a schematic sectional view of a sensor section.

Then, description will be given of a fifth embodiment with reference to accompanying drawings. FIG. 11 is a plan view of the four (2×2) sensor sections 4 of FIG. 1, and FIG. 12 is a sectional view taken along line A-A of FIG. 11 (of one sensor section only). A construction related to a glass substrate 1, a lower-layer insulating film 11 and first wires 2 are the same as in the first embodiment; therefore, description thereof will not be repeated herein.

A numerical symbol 8 indicates a first electrode disposed on the substrate 1 and the first electrode 8 has a disk-like land the center of which serves as a contact point portion. The first electrode 8 is of a layer structure made of, for example, Al and Mo and is connected to the first wire 2 extending in the row direction through a contact layer 12 interposed therebetween. A construction of the contact layer 12 is the same as in the first embodiment; therefore, description thereof will not be repeated herein.

A numerical symbol 9 indicates a second electrode disposed opposite to the first electrode 8 with a cavity 10 interposed therebetween and serves additionally as a second wire 3 in the column direction. The cavities 10 between the first electrodes 8 and the second electrodes 9 communicate with each other in the respective column directions in the sensor sections 4 through two communication portions 31 for each column and the cavities 10 are finally open in vent hole sections 5 which are disposed at the ends of the corresponding column. The second electrode 9 is made of, for example, Mo and each sensor section 4 is in the shape of almost a tetragon, the periphery thereof is sufficiently remote from the outline of the first electrode 8 and release holes 15 are provided at the four corners. In this example of the figure, the second electrode 9 substantially determines a size of the sensor section 4 and the size is, for example, a square of 50 μm×50 μm per one contact point sensor. Note that in this embodiment, a width of the second electrode 9 is the same as that of a metal layer formed integrally with the second electrodes 9 and existing between adjacent sensor sections 4. The metal layer existing between adjacent sensor sections 4 plays a role of not only covering the communication portions 31 but also electrically connecting between the second electrodes 9 in adjacent sensor sections 4, thereby causing the second electrodes 9 to serve as the second wire 3. The metal layer including the second electrodes 9 is regarded as the second wire 3 and also serves as an electrode in a narrow, long shape on the whole.

Plural release holes 15 are preferably provided in one of all the sensor sections. In the present invention, each release hole 15 is provided in the second electrode 9 in a configuration that the peripheral portion of the first electrode 8 is viewed from the release hole 15, that is the release hole 15 has at least a part disposed opposite to the first electrode 8. Since it is desired that the release hole 15 is, however, finally closed with the protective film 17 or the like, the first electrode 8 cannot be observed from the release hole 15 in an operating state of the sensor section 4. This is because since the release holes 15 are located near the contact point region 27, dust or liquid intrudes into the cavity 10 through the release holes 15 if the holes are open in the outside air, leading to a possibility of troubles such as contact fault.

Note that in this embodiment, the release holes 15 are formed nearer the center of the sensor section 4 as compared with the state in the first embodiment. While etching treatment is conducted to remove an intermediate layer 25, the etching solution reaches the intermediate layer 25 through the release holes 15 and etching gets started at the end portion of the intermediate layer 25 and advances sequentially into the interior; therefore, if the release hole 15 is located inwardly in the sensor section 4, a removal efficiency of the intermediate layer 25 is enhanced, whereas there arises a possibility that the first electrode 8 is also etched off while the release holes 15 is formed since the central portion of the sensor section 4 are not covered with the first insulating film 13. Therefore, an inner side end of the release hole 15 is preferably located on the outer peripheral edge of the first electrode 8 covered with the first insulating film 13.

To be further detailed, since the release holes 15 are located in the peripheral portion of the first electrode 8, an opening at an etching front is not of a horizontal plane but of an oblique surface, which helps gas bubbles generated, though being reduced, during etching escape with extremely excellent efficiency, with the result that irregular etched-off or etching residue is harder to be caused. Since the release hole 15 is disposed above a portion where the first electrode 8 and the first insulating film 13 are overlapped one on the other, gas generated in the cavity 10 can be discharged to the outside from the release hole 15 when the gas reaches in the neighborhood of the peripheral portion of the first electrode 8. For example, in a case where the release hole 15 is located at a site outside the first electrode 8, even gas in the cavity 10 having reached the peripheral portion of the first electrode 8 is required to further move over to the release hole 15. Since a level difference occurs in a clearance between the peripheral portion of the first electrode 8 and the release hole 15 by a thickness of the first electrode 8, however, gas in the cavity 10 has to climb over the level difference in order to reach the release hole 15. Therefore, by disposing the release hole 15 so as to overlap the first electrode 8 in a plan view, gas in the cavity 10 can be discharged with a good efficiency.

In this embodiment, the release hole 15 is formed so as to overlap the communication portion 31. Since the communication portion 31 is a narrow, long path, the intermediate layer present in the communication portion 31 can be certainly removed during fabrication by providing the release hole 15 on the communication portion 31.

A numerical symbol 13 indicates a first insulating film stacked on the first electrode 8, and the first insulating film 13 is in the shape of a combination of two rings concentrically arranged. The first insulating film 13 is made of, for example, SiNx or $SiO_2$ and covers main parts of the underlying layer 11 and the first electrode 8 and, in this embodiment, also specifies shapes of the second electrode 9 and a coat provided thereon in a close contact. Since the central portion of the first electrode 8 is the contact point region 27 functioning as a contact point, the electrode is exposed and not covered with the first insulating film 13, while since the first electrode 8 is not necessary to be exposed in an recess 28 of the first insulating film 13, the first electrode 8 may be covered with a thinner portion of the first insulating film 13. In this case, a sectional view of the first insulating film 13 shows the shape of almost a recess. Note that in this embodiment, the first electrode 8 is exposed in the recess 28. In a case where the first electrode 8 is exposed in the recess 28, the recess 28 also works as a contact point, which renders the sensor more sensitive accordingly. Since a level difference at the recess 28 is larger, a profile of depression and protrusion combined of the second electrode 9 described later is enhanced, thereby improving a strength of the second electrode 9.

A numerical symbol 29 indicates an overcoat film, and the overcoat film 29 covers the second electrode 9. A numerical symbol 16 indicates a second insulating film and a numerical symbol 17 indicates a protective film, and the second insulating film 16 and the protective film 17 are stacked on the overcoat film 29. The overcoat film 29, the second insulating film 16 and the protective film 17 are the same as those in the fourth embodiment in material and construction; therefore, description thereof will not be repeated herein.

Since while the second electrode 9 itself is at an almost uniform thickness, a surface profile of the intermediate layer 25 assumes a profile of depression and protrusion combined in conformity with that of the first insulating film 13; therefore, the second electrode 9 also assumes a wavy profile. That is, the second electrode 8 rises at site where the first insulating film 13 exists, while sinking at a site of the recess 28, wherein if the rise and recess are concentric circles, the pattern in the plan view looks like wave rings when a stone is thrown onto a water surface. In such a way, since the second electrode 9 has a profile of depression and protrusion combined, the second electrode 9 becomes more flexible and increases a restoring force. When a strong pressure is imposed on the second electrode 9 and the protective film 17 stacked thereon, as well, a stress is distributed in the whole of the second electrode 9 and the protective film 17, which increases a strength and extremely reduces a possibility of breakage of the second electrode 9.

While in this embodiment, the recess in the first insulating film 13 is provided as one ring recess, the present invention is not limited to this case but plural ring recesses may be provided concentrically. The recess or recesses can be provided in the shape of not concentric circles but bellows.

Figure 13:
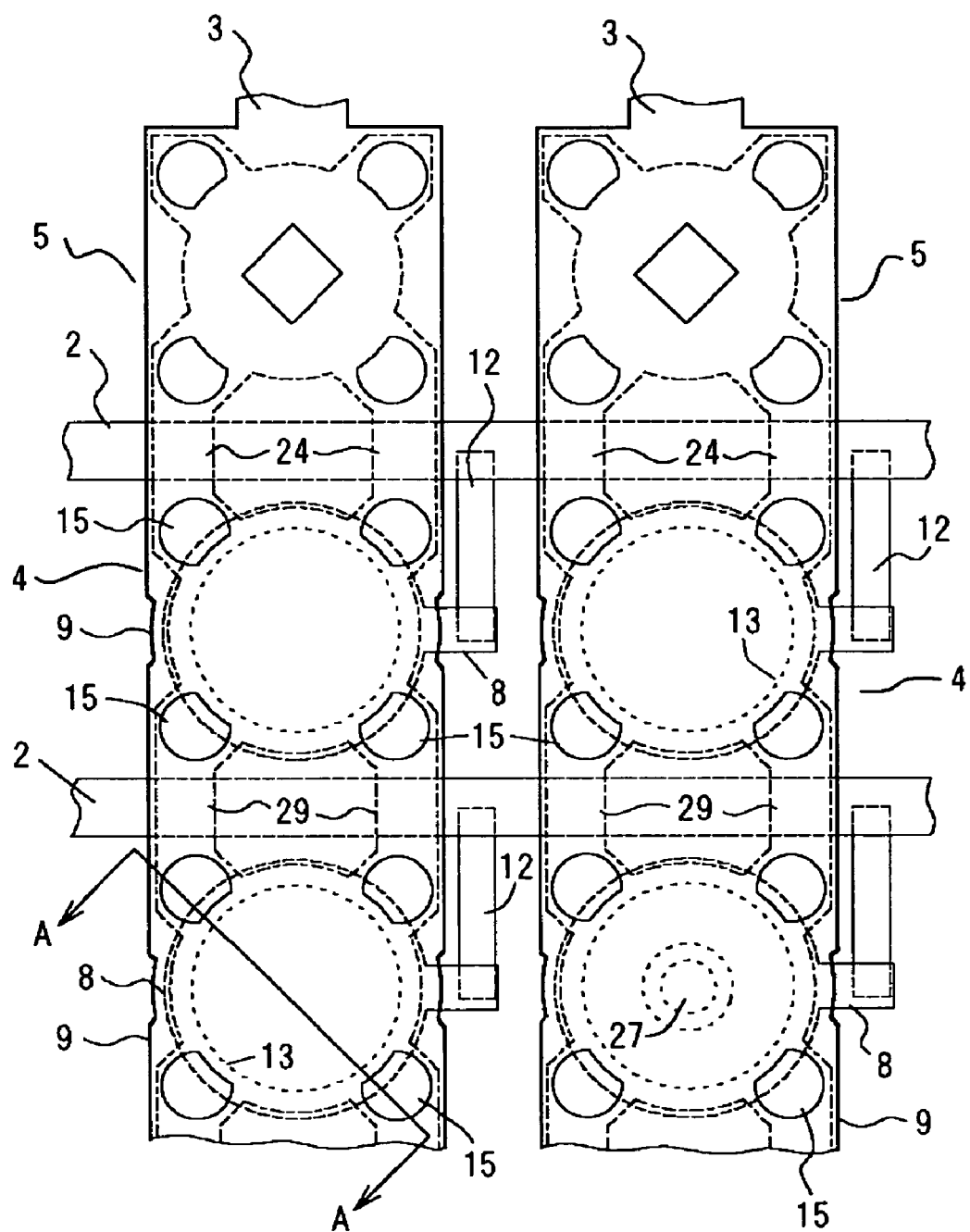
FIG. 13 is a plan view of sensor sections according to a sixth embodiment of the present invention.
Figure 14:
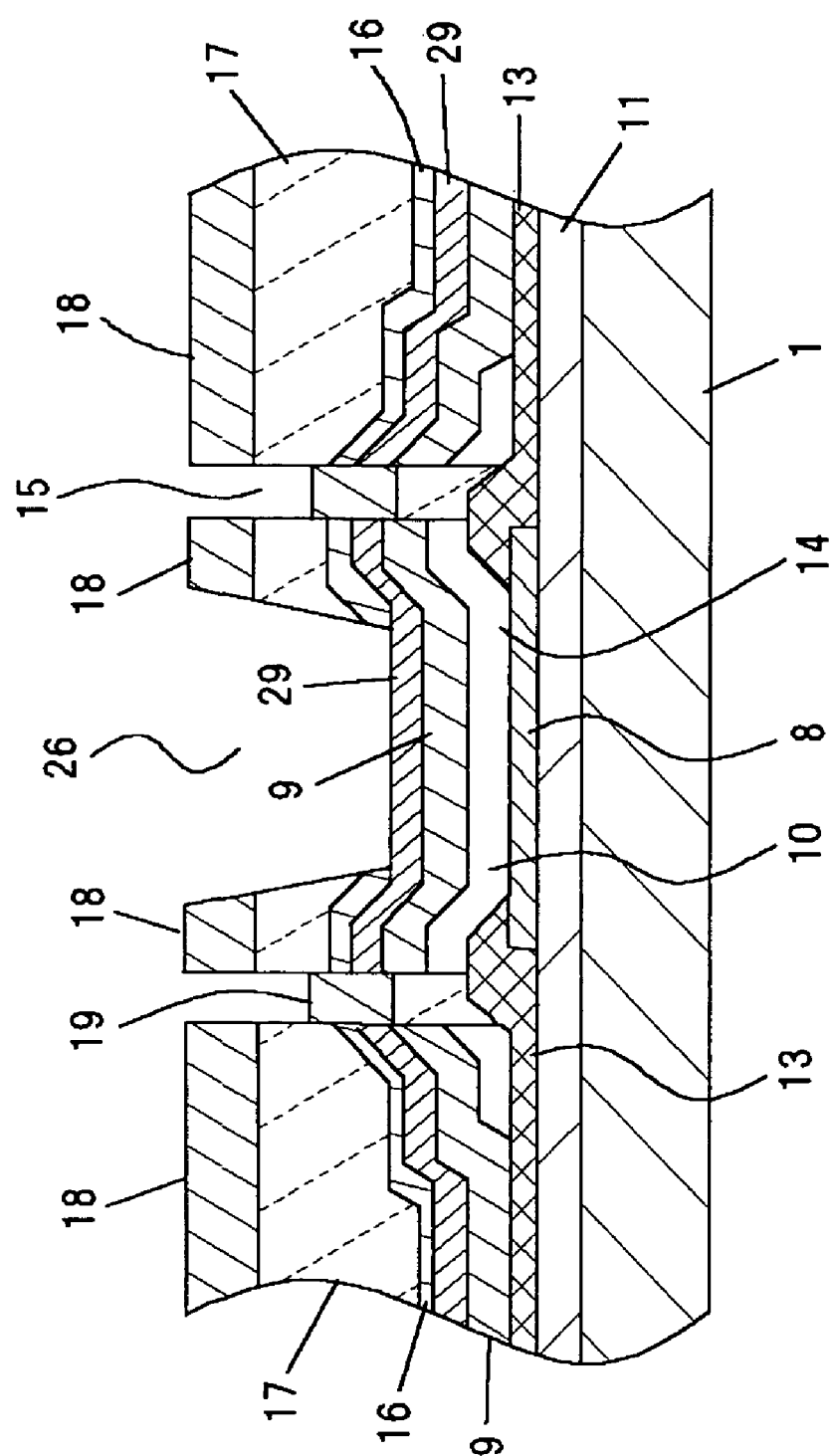
FIG. 14 is a schematic sectional view of a sensor section.

Then, description will be given of a sixth embodiment of the present invention with reference to accompanying drawings. FIG. 13 is a plan view of four (2×2) sensor sections 4 in FIG. 1, and FIG. 14 is a schematic sectional view taken along line A-A of FIG. 13 (of one sensor section only). A construction of a glass substrate 1, a lower-layer insulating film 11, a first wire 2 and a first electrode 8 is the same as in the fifth embodiment; therefore, description thereof will not be repeated herein.

A numerical symbol 13 indicates a first insulating film made of SiNx or $SiO_2$, and the first insulating film 13 covers the lower-layer insulating film 11 and the first wire 2. The first insulating film 13 also covers the outer peripheral portion of the first electrode 8 to thereby form a circular sensor hole 14 with a recess. By covering the outer periphery of the first electrode 8 with the first insulating film 13, a shape of the second electrode 9 disposed opposite to the first electrode 8 on the cavity 10 has a recess to thereby cause the first electrode 8 and the second electrode 9 to be brought not into point contact but into plane contact when contact occurs therebetween.

By adopting a structure in which the first insulating film 13 covers the outer peripheral portion of the first electrode 8 for another purpose of forming the first insulating film 13, a profile of depression and protrusion combined is formed on the second electrode 9 facing the first electrode 8 on the cavity 10. That is, in a case where the second electrode 9 is formed, an intermediate layer 25 with an almost uniform thickness (see FIG. 6) is stacked on the first electrode 8 and the first insulating film 13, the second electrode 9 is stacked on the intermediate layer 25, followed by removal of the intermediate layer 25. Therefore, the second electrode 9 assumes a surface profile following a surface profile of the first electrode 8 and the first insulating film 13 combined. In this embodiment, the surface profile of depression and protrusion combined of the second electrode 9 is provided only in the vicinity of the periphery of the first electrode 8 without providing the profile to the second electrode 9 in the central portion of the first electrode 8. Only with a bend portion of the second electrode 9 at the peripheral portion of the first electrode 8, a restoring force of the second electrode 9 is improved.

Figure 15A:
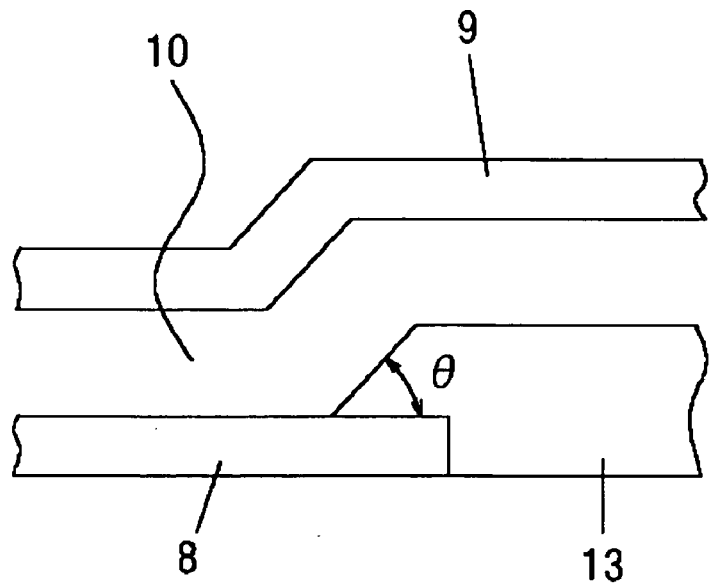
FIGS. 15(a) and 15(b) are schematic sectional views for describing a main part of a sensor section.
Figure 15B:
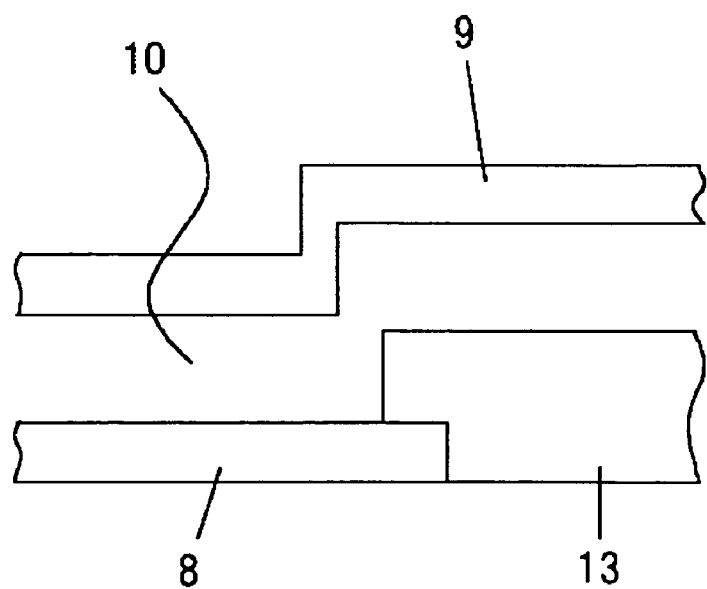
Figure 16:
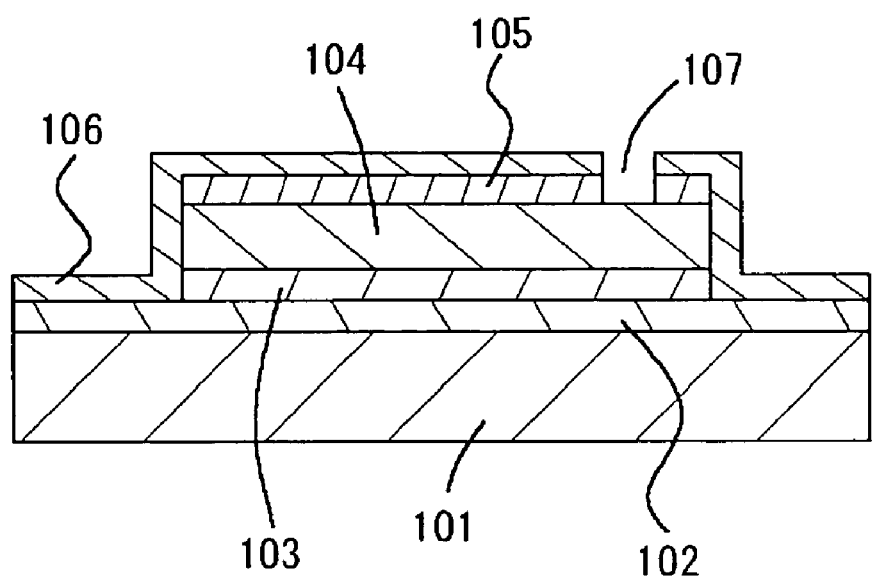
FIG. 16 is a sectional view showing a state of a conventional pressure sensor in a step of a fabrication process therefor.

In the present invention, a section of the end edge of the first insulating film 13 provided on the outer peripheral portion of the first electrode 8 is, as shown in FIG. 15(*a*), inclined at an inclination angle of θ. The inclination angle θ is preferably in the range of about 30° to about 60°, which is the result of examinations of a research. The inclination angle is more preferably in the range of about 40° to about 50°.

Detailed description will be given of an inclination angle at the bend portion of the second electrode 9 based on FIGS. 15(*a*) and 15(*b*). FIG. 15(*a*) shows a second electrode of this embodiment and FIG. 15(*b*) shows a conventional second electrode. If an inclination angle of a section of the first insulating film 13, the bend portion of the second electrode 9 formed in conformity of the profile of the first insulating film 13 is at a right angle and a pressure is imposed directly on the right angled portion of the second electrode 9 when the second electrode 9 is brought into contact with the first electrode 8, leading to breakage of the second electrode 9 with ease.

An inclination angle in section of the first insulating film 13 affects a thickness of the bend portion of the second electrode 9. That is, the intermediate layer 25 and the second electrode 9 are sequentially stacked on the first insulating film 13 to thereby cause the second electrode 9 to form a shape in conformity of a shape of the first insulating film 8, wherein in a case where an inclination angle in section of the end edge of the first insulating film 13 is at a right angle, thickness of the intermediate layer 25 and the second electrode 9 in the vicinity of the end edge of the first insulating film 13 becomes smaller than a thickness of the rest. Therefore, the bend portion of the second electrode 9 is easier to be broken and a thickness of the cavity 10 is also non-uniform, leading to no-uniformity in precision of the sensor sections 4.

On the other hand, in a case where an inclination angle in section of the first insulating film 13 is excessively acute, a problem also arises. That is, if the inclination angle is acute (an angle of the end edge of the first insulating film 13 inclined to the first electrode 8 is 30° or less), a bend portion of the second electrode 9 formed in conformity with the acute angle assume an acute angle and a pressure imposed on the bend portion of the second electrode 9 is distributed when the first electrode 8 and the second electrode 9 are brought into contact with each other, with the result that breakage is harder to occur, but a restorability gets worse.

Through experiments in a research on an inclination angle θ at which the optimal restoring force is exerted while preventing breakage at the bend portion of the second electrode 9, a good result was obtained when an inclination angle θ in section of the first insulating film 13 is in the range of about 30° to about 60°. The inclination angle is more preferably in the range of about 40° to about 50°. If an inclination angle θ in section of the first insulating film 13 is set in the range of about 30° to about 60°, an inclination angle at the bend portion of the second electrode 9 is also in the range of about 30° to about 60° to enable the second electrode 9 with less of breakage and more of restoring force to be realized.

An overcoat film 29 is formed on the second electrode 9. Photosensitive polyimide to form the overcoat film 29 is coated on the substrate 1 and the wet coat is rendered uniform by a spinner. An organic film in portions other than release holes 15 and vent hole 23 is subjected to exposure treatment and the organic film is post-baked at a temperature in the vicinity of about 250° C. (or in the range about 250 to about 300° C.) to harden the organic film and then the organic film is applied with a development treatment to remove the organic film in the portions corresponding to the release holes 15 and the vent hole 23. In a case where a post-baking temperature for the overcoat film 29 is adopted at 200° C., insufficient baking occurs to cause insufficient hardening, adherence of the second insulating film 16 stacked on the overcoat film 29 is degraded and separation of the second insulating film is easier to occur. If a post-baking temperature is lower than 250° C., hardening becomes insufficient to thereby cause water resistance against intrusion of water from the outside to be poorer.

Then, Table 1 shows percents defective caused by falling of a water drop at a post-baking temperature of 250° C. or higher. Table 1 shows typical numerical values of results of a leak point test. A leak point indicates a proportion occupied by defective sensor sections 4 in a pressure sensor, detecting a fine pattern, and constituted of one unit of plural sensor sections 4 in arrangement. A leak point (before) indicates a percent defective before the falling of a water drop and a leak point (after) indicates a percent defective when a time of the order of 10 minutes elapses after the falling of a water drop.

TABLE 1

| Post-baking temperature | Leak point (before): A (%) | Leak point (after): B (%) | Change percent (B − A) (%) |
| --- | --- | --- | --- |
| 250° C. | 0.39 | 0.43 | 0.04 |
| 300° C. | 0.19 | 0.26 | 0.07 |
| 350° C. | 2.13 | 5.96 | 3.83 |

At a post-baking temperature of 250° C., a change between percents defective of a leak point before and after falling of a wafer drop was 0.04 and, at a post-baking temperature of 300° C., the change was 0.07, which are both not more than 0.1; and water resistance is unchanged after the falling of a water drop and generation of defective products was low. In contrast thereto, at a post-baking temperature of 350° C., the value of a leak point (before) rapidly increases to the high value of a leak point (after) to thereby obtain a change percent is 3 or more, which shows degradation of water resistance. In such a way, at a post-baking temperature in the range of about 250° C. to about 300° C., water resistance of a sensor section 4 is good and a product yield of sensor sections 4 is greatly improved.

In the fourth embodiment, a profile with plural depressions and protrusions combined are formed on the second electrode 9 and an overcoat film is stacked on the second electrode 9. In this step, a post-baking temperature of the overcoat film may be about 200° C. In this step, the second electrode was imparted with a profile of depression and protrusion combined to thereby impart the most optimal flexibility and the most optimal restoring force to a laminate film including the second electrode and the overcoat film. At a higher post-baking temperature of an overcoat film, however, a flexibility of the overcoat film is lost in company with an increase in the temperature. Therefore, if an overcoat film treated at a temperature of 250° C. is stacked on the second electrode with plural depressions and protrusions combined, the overcoat film is excessively hard and the laminate of the second electrode and the overcoat thereby loses a flexibility, with the result that inconveniences occur that contact between the first electrode and the second electrode are non-uniform to thereby degrade a sensitivity of a sensor section, to generate cracks in a portion with a profile of depression and protrusion combined and to lower water resistance. Therefore, in a case where the overcoat film 29 is post-baked at a temperature of about 250° C. or higher, a portion of the second electrode 9 corresponding to a sensor region is formed in the shape of a flat plate without a profile of depression and protrusion combined and, thereby, the optimal flexibility and the optimal restoring force can be imparted to the laminate of the second electrode 9 and the overcoat film 29, thereby enabling a uniform sensitivity to be held by the sensor sections 4.

By forming the overcoat film 29 so as to have a uniform film thickness and a smooth surface without a profile of depression and protrusion combined after post-baking, a detection sensitivity of a sensor can be uniform when a pressure is imposed on the second electrode 9 disposed as the lower layer of the overcoat film 29. It is preferable that the overcoat film 29 is made of a material different from that of the second insulating film 16 and has a flexibility and elasticity similar to those of the second electrode 9. Note that while in this embodiment, the overcoat film 29 is formed all over the surface of a metal layer serving as the second electrode 9, the overcoat film 29 may be formed, in the sensor section 4, only in a portion corresponding to the opening 26 from which the second insulating film 16 is removed.

In this embodiment, the second electrode 16 and the protective film 17 are made of the same material as each other, while being formed in respective separate steps. The steps forming the second insulating film 16, the cavity 10 and the protective film 17 are the same as those in the first embodiment; therefore, description thereof will not be repeated herein.

After the sensor section 4 is completed, photosensitive polyimide serving as a sealing material 18 is coated on the protective film 17 to then obtain a uniform film from the wet coat by means of a spinner. Then, the organic film is hardened in exposure treatment except a portion corresponding to the opening 26 having almost the same area as the sensor hole 14 to thereby remove the organic film of the opening 26 in development treatment. Therefore, the organic film is a film having the opening 26 in the sensor section 4.

Then, the second insulating film 16 and the protective film 17 on the second electrode 9 in the sensor section 4 are removed to form the opening 26. By designing a size of the opening 26 so as to be smaller than that of the opening in the first insulating film, the second insulating film and the protective film are left in the bend portion of the second electrode, which improves a strength of the bend portion. By setting a diameter of the opening 26 to a value of the order in the range of about 24 to 28 μm, the laminate of the second electrode and the overcoat film can be provided with a proper flexibility and a proper restoring force. In this step, the opening 26 is formed using an etching solution to remove SiNx, while in a case where no overcoat film 29 is present on the second electrode 9, the etching solution penetrates the second electrode 9 to eventually intrude into the cavity 10. The etching solution having intruded into the cavity 10 cannot be removed since the cavity is a hermetically sealed state and remains therein. The sensor section 4 does not effectively operate because of the presence of the etching solution, which influences reliability thereof. Therefore, by forming the overcoat film 29 on the second electrode 9, the etching solution is prevented from penetration by the overcoat film 29, so that the etching solution does not intrude into the cavity 10.

Therefore, the overcoat film 29 is formed with a material different from a material of which the second insulating film 16 is made stacked directly on the overcoat film 29 and an etching solution used when the opening hole 26 is formed is one that can etch off the second insulating film 16, but cannot etch off the overcoat film 29.

While in this embodiment, description is given of the case where the end edge of the first insulating film 13 is located at the peripheral portion of the first electrode 8, the present invention is also effective for a case where part of the first insulating film 13 exists in the central portion of the first electrode 8. For example, in the case of the fifth embodiment, as well, the end edge of the first insulating film 13 is preferably inclined.

In the embodiments, all of the insulating film on the second electrode is removed or only the thin overcoat film is left thereon. With such a construction, the optimal flexibility and the optimal restoring force can be imparted to the second electrode, while another film may be stacked on the second electrode 9 in a manner such that the restoring force and the flexibility are not lost. For example, an insulating film with a thickness may be provided in the central portion of a sensor section or a different insulating film may be provided only in the central portion of a sensor section.

INDUSTRIAL APPLICABILITY

According to the present invention, the flexibility with which the second electrode serving as an upper electrode of a microsensor curves depending on a pressure to the side of a first electrode and the restoring force with which the second electrode restores the original state when the pressure becomes zero are set to respective desired states. With such settings, in a pressure sensor for detecting a fine pattern such as a finger print sensor, a user can set various levels of flexibility and a restoring force adapted for a purpose or an application, thereby enabling a pressure sensor having fewer failures in sensor sections, and a proper sensitivity to be provided.

In a case where restorability of a second electrode is improved using with a surface profile of depression and protrusion combined thereon, by inclining the end edge of a first insulating film covering the peripheral portion of a first electrode at a predetermined angle, a pressure is distributed without being concentrating at a bend portion of the second electrode, thereby enabling a pressure sensor harder in breakage to be provided, though a load would be otherwise concentrated at the bend portion to thereby cause the second electrode to be broken with more of ease.

In a case where a cavity of a pressure sensor is formed, release holes are disposed in a second electrode so as to correspond to the peripheral portion of a first electrode; thereby enabling an intermediate layer to be efficiently removed without unevenness.

In a case where an insulating film on a second electrode is removed, an overcoat film is formed on the second electrode and the overcoat film is smoothed since an etching solution, in some case, intrudes into a cavity, thereby enabling breakage of a sensor section to decrease, and in addition, a pressure sensor improved on water resistance and with a high product yield to be obtained.

In a case where an overcoat film is formed on a second electrode, an overcoat film is formed at a temperature in the range of 250 to 300° C. to thereby better water resistance and greatly improve a product yield of sensor sections.

The invention claimed is:

1. A pressure sensor comprising plural sensor sections arranged in a matrix, wherein
each of the sensor sections includes:
a first electrode disposed in a sensor section;
a first insulating film covering the first electrode;
a sensor hole formed in the first insulating film and, also, exposing part of the first electrode;
a cavity located at least above the sensor hole and a portion surrounding it; and
a second electrode disposed opposite to the first electrode with the cavity interposed therebetween and capable of being curved to the first electrode side;
wherein the first electrode comprises:
a central portion located at about the center of the sensor section; and
an annular portion located in the sensor section and that encloses the central portion.

2. The pressure sensor according to claim 1, wherein the first insulating film has at least one recess on the first electrode in addition to a sensor hole thereon.

3. The pressure sensor according to claim 1, wherein an end edge of the first insulating film is located at the periphery of the first electrode.

4. The pressure sensor according to claim 1, wherein a thickness of the first insulating film present at the periphery of the sensor hole is in the range of about 2000 to about 5000 angstroms.

5. The pressure sensor according to claim 1, wherein the sensor hole is in the shape of a circle and a diameter thereof is in the range of about 5 to about 40 µm.

6. The pressure sensor according to claim 1, wherein the end edge of the first insulating film rising from a surface of the first electrode located below the cavity is inclined to the first electrode.

7. The pressure sensor according to claim 1, wherein release holes are disposed in the second electrode so as to correspond to a peripheral portion of the first electrode.

8. The pressure sensor according to claim 1, wherein a second insulating film is stacked on the second electrode, and the second insulating film in the vicinity of a center of the sensor section is removed to form an opening.

9. The pressure sensor according to claim 8, wherein the removed portion of the second insulating film in the sensor section is in the shape of a circle and a diameter thereof is in the range of about 24 to about 28 µm.

10. The pressure sensor according to claim 8, wherein an overcoat film is formed on the second electrode in the opening.

11. The pressure sensor according to claim 10, wherein the overcoat film is made of a material different from that of the second insulating film.

12. The pressure sensor according to claim 10, wherein the second insulating film is formed with an inorganic insulating film, and the overcoat film is formed with an organic insulating film.

13. The pressure sensor according to claim 10, wherein the surface of the overcoat film in the center of the sensor section is flat.

* * * * *